United States Patent
Brady, Jr. et al.

(10) Patent No.: US 7,836,472 B2
(45) Date of Patent: Nov. 16, 2010

(54) SYSTEM AND METHOD FOR LOADING CONTENT IN AN IN-FLIGHT ENTERTAINMENT SYSTEM

(75) Inventors: Kenneth A. Brady, Jr., Trabuco Canyon, CA (US); Andrew W. Weimholt, Mission Viejo, CA (US); Jason Kyong-min Yi, Irvine, CA (US)

(73) Assignee: Thales Avionics, Inc., Irvine, CA (US)

( * ) Notice: Subject to any disclaimer, the term of this patent is extended or adjusted under 35 U.S.C. 154(b) by 1351 days.

(21) Appl. No.: 11/139,208

(22) Filed: May 27, 2005

(65) Prior Publication Data

US 2006/0031748 A1    Feb. 9, 2006

Related U.S. Application Data

(60) Provisional application No. 60/574,871, filed on May 27, 2004.

(51) Int. Cl.
*H04N 7/18* (2006.01)
*H04N 7/173* (2006.01)

(52) U.S. Cl. .................. 725/76; 725/74; 725/75; 725/92; 725/115

(58) Field of Classification Search .................. 725/75, 725/76, 77, 92, 115, 74, 86; 709/213, 214
See application file for complete search history.

(56) References Cited

U.S. PATENT DOCUMENTS

| | | | | |
|---|---|---|---|---|
| 5,524,272 A | * | 6/1996 | Podowski et al. | 725/74 |
| 5,973,722 A | | 10/1999 | Wakai et al. | |
| 6,490,725 B2 | * | 12/2002 | Kikinis | 725/87 |
| 7,580,528 B2 | * | 8/2009 | Farley et al. | 380/270 |
| 2001/0018772 A1 | * | 8/2001 | Shibata et al. | 725/93 |
| 2003/0208579 A1 | | 11/2003 | Brady, Jr. et al. | |

OTHER PUBLICATIONS

Subramanian, "In-Flight Entertainment," White Paper, Wipro Technologies, pp. 1-13 (2002).

* cited by examiner

*Primary Examiner*—John W Miller
*Assistant Examiner*—John Schnurr
(74) *Attorney, Agent, or Firm*—Drinker Biddle & Reath LLP

(57) ABSTRACT

An in-flight entertainment system is shown wherein digital content servers are interconnected with network servers such that the content servers can communicate with one another and with a portable data loader. The loader stores digital content files that are to be downloaded to the content servers. A script downloaded to each content server is executed by the server to download some of the files from the portable data loader and cross-load other files from other content servers. Alternatively, a content inventory list is downloaded to each content server that indicates which content server is to download each content file and which content servers are to receive the content file. Each content server parses the list to identify files for which it is the download server, request download of those files, identify other files that it should have and request cross-load of those files from other content servers.

22 Claims, 13 Drawing Sheets

<Type>,<ID>,<Filename>,<CoFilename>,<Title>,<Length>,<Rights>, <Server>

Field Definition
<Type> - type of content (movie, audio pgm, web site, etc)
<ID> - identifier for content (link to SIF for broadcast material)
<Filename> - File name of content (on load source)
<CoFilename> - File name of Associated Data (on load source)
<Length> - Playing Time
<Rights> - Restrictions on Use (e.g. month)
<Server> - Server or server group onto which content is to be located Server Group Definitions
SG1, DSU18260-1                        /* Broadcast Only Content */
SG2, DSU-D2-1, DSU-D2-3                /* Interactive Content on One Server Group */
SG3, DSU-D2-2, DSU-D2-4                /* Interactive Content on Second Server Group */
SG4, DSU-D2-1, DSU-D2-2, DSU-D2-3, DSU-D2-4 /* Interactive Content on All DSU-D2 */
SG5, DSU18260-1, DSU-D2-1, DSU-D2-2, DSU-D2-3, DSU-D2-4   /* Content on All Servers */
SG6, SVDU Movie
@ January Section
V, 10101, 50001.mpg, 50001.tgz, "Pretty Woman", 116, Jan, SG5
V, 10102, 50432.mpg, 50432.tgz, "Batman Returns", 127, Jan, SG5
A, 20101, 50101.mp3, 50101.tgz, "Come On Over", 3.43, Jan, SG1

@ February Section
V, 10101, 54032.mpg, 54032.tgz, "A Time For Us", 122, Feb, SG5
V, 10102, 54421.mpg, 54421.tgz, "Matrix", 143, Feb, SG5
A, 20101, 50401.mp3, 50401.tgz, "Crash", 4.32, Feb, SG1

@ Unrestricted Section
V, 14001, 23145.mpg, 23145.tgz, "Safety Video-Spanish", 2.14, All, SG1
V, 14002, 23146.mpg, 23146.tgz, "Safety Video-English", 2.14, All, SG1
A, 24001, 24512.mp3, 24512.tgz, "Decompression Message", 1.50, All, SG1
A, 25001, 24573.mp3, 24573.tgz, "Clare de la Lune", 7.5, All, SG5
V, 15001, 24172.mpg, 24172.tgz, "Arrival Video-Madrid", 6.0, All, SG5
V, 15002, 24172.mpg, 24172.tgz, "Arrival Video-LAX", 6.0, All, SG5

@ SIF Section
U, EastRoute.sif, "East Bound Use", SG1
U, WestRoute.sif, "West Bound Use", SG1

@ Game Section
G, PakMan.tgz, "Packman", SG4
G, PakMan.gam, "Packman", SG6

SYSTEM AND METHOD FOR LOADING CONTENT IN AN IN-FLIGHT ENTERTAINMENT SYSTEM

CROSS-REFERENCE TO RELATED PATENT APPLICATIONS

This patent application claims the benefit of U.S. Provisional Patent Application No. 60/574,871, filed May 27, 2004.

BACKGROUND

The present invention is directed toward in-flight entertainment (IFE) systems and, more particularly, to the loading of content for IFE systems.

DESCRIPTION OF THE RELATED ART

In-flight entertainment (IFE) systems are typically used to provide services, such as in flight entertainment, to passengers on board an aircraft. The typical architecture of an IFE system includes a server or servers at a head end of an IFE system to store content, such as MPEG material, and distribute it as required to produce the desired entertainment. The architecture of the server or servers and the methodologies used for using the data vary for each system.

Content, such as MPEG encoded movie material, is typically stored on large hard disk drives in the IFE system. Disk drive technology has operated on a development cycle, which has doubled the disk capacity around every 18 months. Presently, disk drives with a capacity of approximately 180 GB (180,000,000,000 bytes or 1,440,000,000,000 bits) are being incorporated into products. A typical problem for IFE systems is the need to load large quantities of entertainment material onto the system.

Often, the content on IFE systems is encoded in order to reduce its size. Encoding is the process of converting a video image and it's associated audio into a digital equivalents. A straightforward conversion from analog video to digital results in extremely large amount of data. A variety of sampling and compression techniques have been developed to reduce the amount of data required to produce an acceptable representation of the original video and audio program. The Motion Picture Experts Group (MPEG) has developed three standards for Encoding Video and Audio material that are typically utilized in the In Flight Entertainment industry; MPEG 1, MPEG 2, and MPEG 4.

MPEG 1 is the dominant encoding method utilized today in In-Flight Entertainment. MPEG 1 does not specify a specific video resolution nor does it specify a specific data rate. The industry has adopted a resolution appropriate for NTSC television viewing (often referred to as SIF resolution or 352 pixels×240 pixels). This resolution is often described as "SVHS equivalent". A data rate in common use is 1.5 Mbps consisting of the encoded video program and one associated audio program. Additional audio programs can be added each adding between 128 and 192 kilo bits per second (kbps) to the data rate. Thus an MPEG 1 program is typically encoded at a data rate of 1.5 to 2.0 Mbps.

MPEG 2 is the dominant encoding method utilized today in the Digital Television market (cable TV). As with MPEG 1, MPEG 2 does not specify a specific video resolution or data rate. Typically MPEG 2 is encoded at a video resolution of around 720 pixels×480 pixels for full D1, 352×480 for half D1 and the algorithms used are an improvement over that utilized for MPEG 1. Typically an MPEG 2 program is encoded at a rate around 3.5 to 4.0 Mbps (including one audio program) although it is common for rapid motion programs (such as sports) to be encoded at even higher bit rates). Since the resolution is much higher, an MPEG 2 encoding at the same data rate as an MPEG 1 encoding results in a much lower quality playback. Audio encoding remains around 128 to 192 kbps for each stereo program. For a typical IFE application, the increased resolution is not visible to the average user. There is some movement in the IFE industry to utilize the MPEG 2 algorithms but at a lower resolution and produce programs at around 2.0 Mbps for half D1.

MPEG 4 is an emerging encoding method, which is in the final stages of development and adoption by the MPEG committee. It introduces improvements in algorithms and methods, which provide for a much wider range of effective data rates and image resolutions. All indications are that MPEG 4 will be capable of producing MPEG 2 quality images at MPEG 1 data rates.

So MPEG 1 and MPEG 4 will utilize approximately the same data rate whereas MPEG 2 requires almost twice the data rate. Any new IFE system development will incorporate MPEG 2 capability into the design, however it is possible (even likely) that the additional bandwidth and storage capacity required for MPEG 2 will be bypassed by an early adoption of MPEG 4 at the lower rates.

FIG. 1 illustrates an example of a simplified architecture 100 for an IFE system. In architecture 100, a backbone data network 110 is coupled to a management terminal 112, a digital service unit (DSU) 114 and an audio and video controller 116. In this example, backbone data network 110 is coupled to front-end network 120 that couples DSU 114 to a plurality of area distribution boxes (ADBs) 122 and 124 and tapping unit 126, which drives display 128. A broadcast audio and radio frequency (RF) signal bus 130, in this example, carries an output of audio and video controller 116 to ADBs 122 and 124 and to tapping unit 126.

Management terminal 112 typically provides a user interface to the IFE system for flight crewmembers or maintenance staff. For example, a user can specify software configurations for some of the other system units or can allow a user to enable or disable the availability of audio/video content or wide area network access to passenger on the aircraft. For example, a user can select a movie for output to tapping unit 126 from audio and video controller 116 via broadcast bus 130.

Area distribution boxes 122 and 124 are each generally a local seat-level routing device that controls distribution of signals from the front-end network 120 and broadcast bus 130 to seat electronics devices that provide services to passengers. The ADBs also receive and route messages from the seat boxes to provide, for example, overhead reading lights, attendant call indicators, and channel selections.

Audio and video controller 116 generally operates as an entertainment headend controller that can perform a variety of functions. Controller 116 may interact with input devices, such as cameras, video players, audio players, or similar content providing devices. The content is provided to ADBs 122 and 124 or tapping unit 126 via broadcast bus 130. For example, management terminal 112 may be used to send a command to controller 116 to select a movie playing in a video player for transmission over broadcast bus 130 to tapping unit 126 for output on display 128. Controller 116 may also be used to relay inputs from the cockpit, for crew announcements and flight information and display.

Digital server unit 114 provides analog and video outputs derived from digital content stored, for example, on a hard disk drive, compact disk, or other storage devices. The DSU is typically modular in construction and includes component subsystems that, for example, provided control and interface functions, audio or video decoding, analog buffering, RF modulation, and multiplexing of audio or video signals into a combined signal. For example, a DSU may have a movie stored on hard drive whose digital audio and video data is decoded and RF modulated for output onto broadcast bus 130 for output to ADBs 122 and 124 or tapping unit 126. Alternatively, DSU 114 may be configured to transmit the audio and video data for the movie over network 120 to ADBs 122 and 124 and to tapping unit 126. In this alternative, the DSU, which typically includes a central processing unit (CPU), accesses digital content stored on a disk drive and streams the digital content using TCP/IP protocols through a network interface to network 120 in order to provide the digital content to video or audio clients, where the digital data is decoded and converted to analog audio and/or video signals.

Video content is typically stored on a storage unit, such as a high performance disk drive, of the DSU in a compressed format, such as the Motion Picture Expert Group (MPEG) formats MPEG-1 and MPEG-2. Similarly, the audio content is typically stored in a compressed format, such as MPEG-3 (MP3). The storage unit is typically accessed using a high speed interface, such as a SCSI interface, which may be accessed by a technician in order to load content onto the storage unit. Multiple DSUs may be utilized in order to provide content to ADBs, tapping units, or other client devices.

Tapping unit 126 is typically a device that is addressable via network 120 for tapping a broadcast signal provided via broadcast bus 130 or a digital stream provided via network 120 for distributing selectable or predetermined portions of the signal to one or more display units, such as display 128, which may be for viewing by a single passenger or multiple passengers. The tapping unit 126 functions to turn the display unit on and off and may, in the case of a unit configured to tap into the signals provided via broadcast bus 130, operate to tune a tuner for audio or video channel selection. Alternatively, the tapping unit may operate to decode a selected digital audio or video stream in order to generate an audio or video signal.

Further details regarding an example of an IFE system are set forth in commonly owned and assigned U.S. patent application Ser. No. 10/136,237, filed May 1, 2002, entitled "Method and System for Configuration and Download in a Restricted Architecture Network," herein incorporated by reference in its entirety for all purposes. See also the whitepaper entitled "In-flight Entertainment," B. Anantha Subramanian, Wipro Technologies, 2002, herein incorporated by reference, that generally describes IFE systems.

SUMMARY OF THE INVENTION

An embodiment of a method, according to the present invention, for loading content onto an in-flight entertainment system calls for providing a plurality of content server units for storing content, providing a plurality of network server units, interconnecting each of the content servers with the plurality of network server units such that each content server can communicate with at least one other content server. The method involves connecting a data loading device to the plurality of network server units, where the data loading device includes a set of digital content files for download to the plurality of content servers. The method also sets forth automatically downloading a first subset of the set of digital content files from the data loading device to a first one of the plurality of content server units and automatically downloading a second subset of the set of digital content files from the data loading device to a second one of the plurality of content server units. This embodiment also calls for automatically cross-loading the first subset of the set of digital content files from the first content server unit to the second content server unit and automatically cross-loading the second subset of the set of digital content files from the second content server unit to the first content server unit.

A refinement of this embodiment calls for providing a plurality of content server units each having multiple network connections and providing a plurality of network server units each having multiple connections. This refinement sets forth interconnecting the content servers with the network servers so that multiple content servers can simultaneously communicate with other content servers. Also, the step of connecting a data loading device to the plurality of network server units is refined to include connecting the data loading device to the plurality of network server units using multiple network connections. In this refinement, the steps of automatically downloading a first subset of the set of digital content files and automatically downloading a second subset of the set of digital content files take place substantially simultaneously. Also, the steps of automatically cross-loading the first subset of the set of digital content files and automatically cross-loading the second subset of the set of digital content files take place substantially simultaneously.

In a different refinement of this embodiment, the method includes downloading a first script to the first content server and downloading a second script to the second content server. In this approach, the step of automatically downloading a first subset of the set of digital content files from the data loading device to a first one of the plurality of content server units includes sending a get request for the first subset of the set of digital content files to the data loading device from the first content server unit in accordance with the first script. Also, the step of automatically downloading a second subset of the set of digital content files from the data loading device to a second one of the plurality of content server units includes sending a get request for the second subset of the set of digital content files to the data loading device from the second content server unit in accordance with the second script. Further, the step of automatically cross-loading the first subset of the set of digital content files from the first content server unit to the second content server unit includes sending a get request for the first subset of the set of digital content files to the first content server from the second content server unit in accordance with the second script. Finally, the step of automatically cross-loading the second subset of the set of digital content files from the second content server unit to the first content server unit includes sending a get request for the second subset of the set of digital content files to the second content server from the first content server unit in accordance with the first script.

In still another refinement of this embodiment, the method calls for downloading a content inventory list to the first and second content servers, where the content inventory list identifies the digital content files and each content server where the digital content files are to be stored. In this refinement, the step of automatically downloading a first subset of the set of digital content files from the data loading device to a first one of the plurality of content server units includes searching the content inventory list for a file definition for the first subset of the set of digital content files identifying the first content server as a download server for the first subset and, upon finding such a file definition, sending a get request for the first subset of the set of digital content files to the data loading device from the first content server. In a further refinement, the file definition for the first subset of the set of digital content files indicates that the second content server should have the first subset of the set of digital content files. In this further refinement, the step of automatically cross-loading the first subset of the set of digital content files from the first content server unit to the second content server unit includes searching the content inventory list for a file definition indicating that the second content server unit should have content associated with the file definition and, responsive to finding the file definition indicating that the second content server unit should have content associated with the file definition, sending a get request for the associated content to a server indicated as the download server in the file definition.

An embodiment of a network architecture for an in-flight entertainment system, according to the present invention, is composed of a plurality of content server units for storing content and a plurality of network server units, where each of the content servers is interconnected with the plurality of network server units such that each content server can communicate with at least one other content server. A data loading device is configured to be coupled to the network server units, where the data loading device includes a set of digital content files for download to the plurality of content servers. In this embodiment, a first one of the plurality of content server units is configured to automatically download a first subset of the set of digital content files from the data loading device to the first content server and a second one of the plurality of content servers is configured to automatically cross-load the first subset of the set of digital content files from the first content server to the second content server.

In a further refinement of this embodiment, the second content server is further configured to automatically download a second subset of the set of digital content files from the data loading device and the first content server is further configured to automatically cross-load the second subset of the set of digital content files from the second content server unit to the first content server unit.

In another refinement of this embodiment, each of the plurality of content server units has multiple network connections and each of the plurality of network server units has multiple connections, where each of the content servers is interconnected with the plurality of network server units so that multiple content servers can simultaneously communicate with other content servers. The data loading device further includes multiple network connections. The first and second content servers are further configured to automatically download the first and second subsets of digital content files substantially simultaneously and cross-load the first and second subsets of digital content files substantially simultaneously.

In yet another refinement of this embodiment, the first content server is further configured to download a first script and send a get request for the first subset of the set of digital content files to the data loading device from the first content server unit in accordance with the first script and the second content server is further configured to download a second script and send a get request for the second subset of the set of digital content files to the data loading device from the second content server unit in accordance with the second script. In yet a further refinement of this embodiment, the second content server is further configured to send a get request for the first subset of the set of digital content files to the first content server from the second content server unit in accordance with the second script and the first content server is further configured to send a get request for the second subset of the set of digital content files to the second content server from the first content server unit in accordance with the first script.

In a different refinement of this embodiment, the first and second content servers are configured to download a content inventory list, where the content inventory list identifies the digital content files and file definitions indicating each content server where the digital content files are to be stored and identifying at least one of the content servers as a download server for downloading the file associated with the definition from the data loading device. Each of the first and second content servers is further configured to search the content inventory list for a file definition identifying the respective content server as a download server for the file associated with the file definition and, upon finding such a file definition, sending a get request for the file associated with the file definition to the data loading device requesting download of the file to the respective content server. In a further refinement, the file definition indicates which servers that the associated file should be stored on and each of the first and second content servers if further configured to search the content inventory list for a file definition indicating that the respective content server unit should have the file associated with the file definition. Responsive to finding the file definition indicating that the respective content server unit should have the file associated with the file definition, sending a get request for the associated file to a server indicated as the download server in the file definition.

In an embodiment of a method for crossloading content onto a replacement content server unit in an in-flight entertainment system, the method sets forth providing a plurality of content server units for storing content, providing a plurality of network server units, and interconnecting each of the content servers with the plurality of network server units such that each content server can communicate with at least one other content server. The method also sets forth downloading a content inventory list to the plurality of content server units, where the content inventory list identifies digital content files and each content server where the digital content files are to be stored, where the content inventory list includes a file definition for each of the digital content files that indicates the ones of the plurality of content server units where the digital content file should reside. The method calls for automatically downloading and crossloading the digital content files to the plurality of content server units in accordance with the content inventory list. The method further calls for replacing one of the plurality of content server units with a replacement content server unit, transferring the content inventory list to the replacement content server unit from another one of the plurality of content server units, and automatically crossloading digital content files from the other ones of the plurality of content server units to the replacement content server unit in accordance with the file definitions in the content inventory list.

In a further refinement of this method for crossloading content onto a replacement content server unit, the step of automatically crossloading digital content files from the other ones of the plurality of content server units to the replacement content server unit includes searching the content inventory list for a file definition indicating that the replacement content server unit should have content associated with the file definition. Responsive to finding the file definition indicating that the replacement server unit should have content associated with the file definition, the step also includes determining from the content inventory list a second one of the plurality of content server units that also should have the content associated with the file definition. Finally, responsive to finding the file definition indicating that the second content server unit should have content associated with the file definition, the step includes sending a get request for the associated content from the replacement content server to the second content server and transferring the associated content from the second content server to the replacement content server.

BRIEF DESCRIPTION OF THE DRAWINGS

Certain embodiments of the present invention will be described with reference to the following drawings, wherein:

FIG. 8 is a data diagram illustrating an embodiment of a content inventory list according to one embodiment of the present invention;

DETAILED DESCRIPTION OF THE PREFERRED EMBODIMENTS OF THE PRESENT INVENTION

The present invention is directed to the problems associated with loading media content onto an in-flight entertainment system. IFE systems may be required to store large amounts of data in order to provide content to passengers. Even using high speed interfaces, it can take a significant amount of time for a technician or maintenance personnel to load content onto, for example, the DSUs of an IFE system. Maintenance personnel are also frequently limited in the amount of time available for loading content, e.g. between flights of an aircraft. Also, if more content can be loaded and stored in an IFE system, then passengers may be provided with a greater variety of selections and features. The problem is further complicated by the need to provide a high level of service to passengers, which is typically addressed by providing multiple servers for serving media content where each server must be loaded with content. The present invention is, therefore, directed toward loading media content in a multi-server environment.

One example of a system that utilizes multiple digital media servers to provide modularity and incremental increases to network throughput for Video-On-Demand is Thales iSeries IFE system. When multiple servers are used, the need for storing individual media programs on multiple servers arises. In the worst case, all programs must be stored on all servers. The present invention is directed toward minimizing the penalty for having multiple servers for media loading in systems, such as the iSeries.

In one embodiment or the present invention, the system uses a combination of a Portable Data Loader (PDL), Digital Server Units (DSUs), and Ethernet Switch Units (ESU) to provide a high performance network fabric. Using a combination of a direct load from the PDL to the DSUs and a cross load between the DSUs, the present invention is capable of better exploiting the full bandwidth of the PDL and each DSU to load all servers in approximately twice the time it would take to load just one server. In the present invention, the impact of the number of servers in the system on the amount of time required for loading is reduced.

Figure 1:
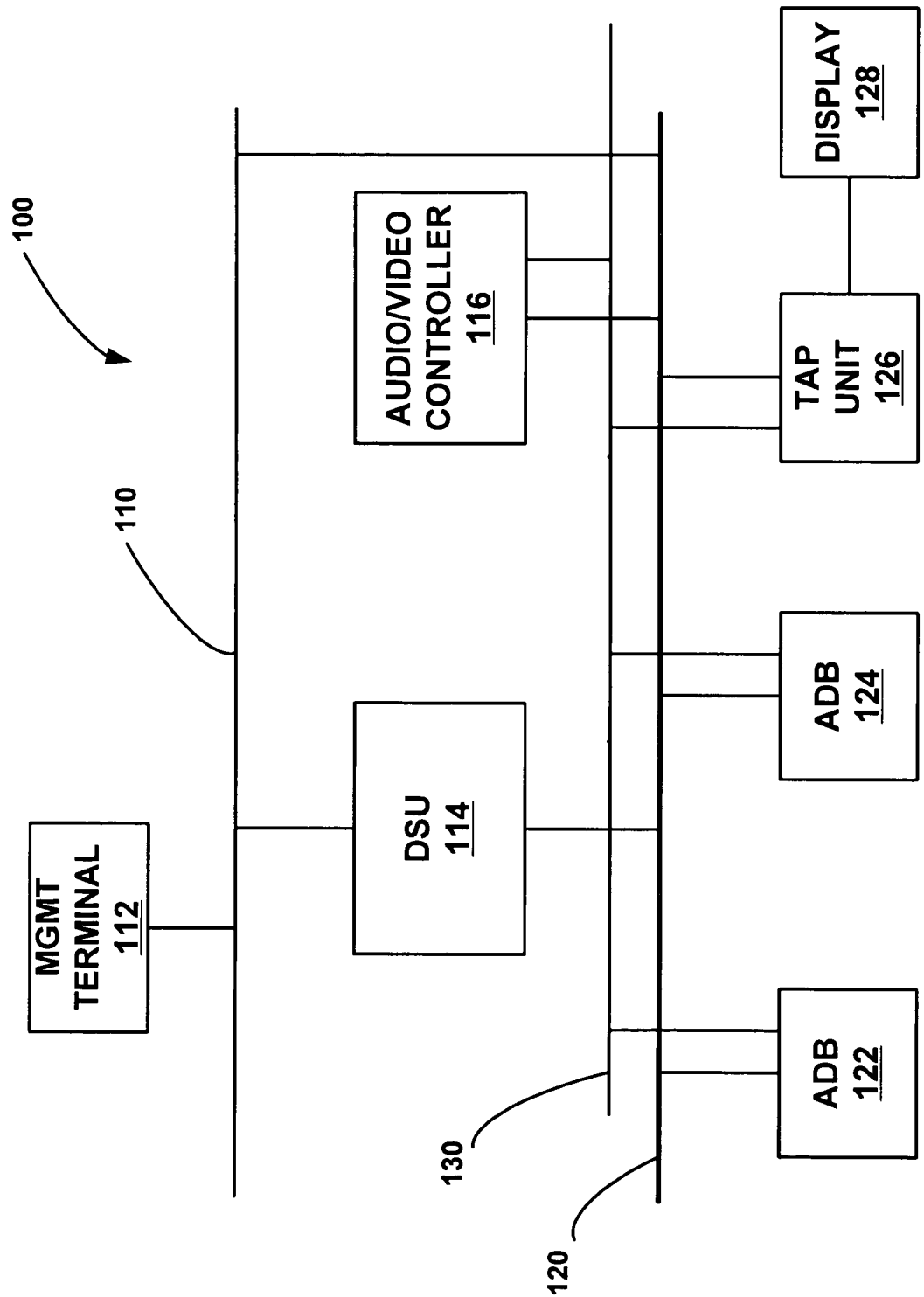
FIG. 1 is a functional block diagram illustrating an example of a network architecture for an in-flight entertainment system.
Figure 2:
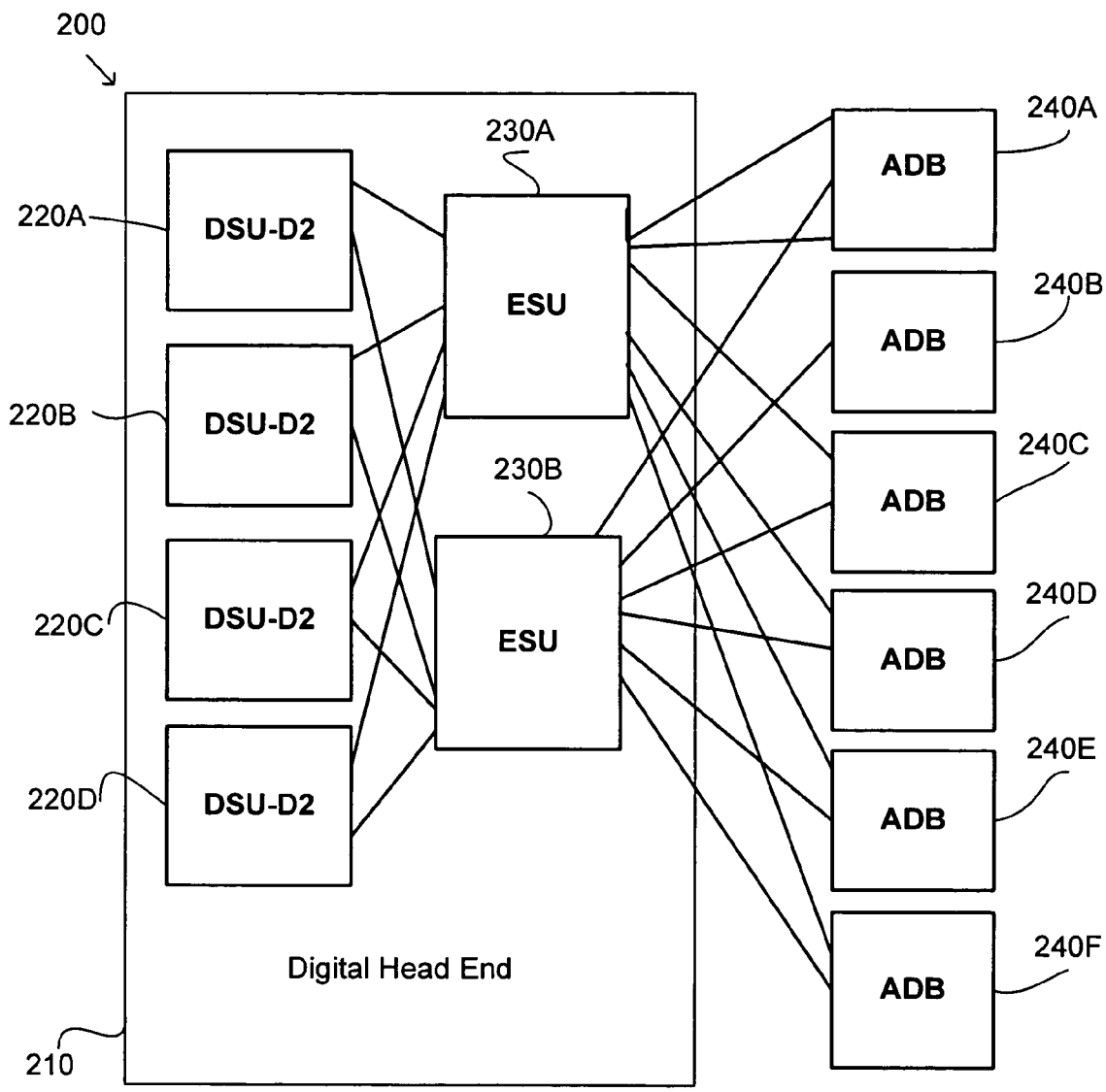
FIG. 2 is a functional block diagram illustrating one exemplary embodiment of a system architecture suitable for application of the present invention.

FIG. 2 is a functional block diagram illustrating one exemplary embodiment of a system architecture 200, such as a Thales iSeries system, that is suitable for application of the present invention. In this example, the system architecture 200 includes a head end 210 that is composed of multiple digital servers (DSU-D2) 220A-D along with Ethernet Switch Units (ESUs) 230A-B to provide high network bandwidth while at the same time providing the modularity to effectively address aircraft having a range of passengers, e.g. ranging from 50 to 1000 passengers. Digital servers 220A-D each have two independent network interface connections connecting the DSU-D2 to one of the two ESUs 230A-B. Each Ethernet Switch Unit (ESU) is a high performance, layer 3 Ethernet switch capable of supporting simultaneous, full bandwidth traffic on all ports. Each ESU is connected to each Area Distribution Box (ADB) 240A-F in the aircraft. If two ESUs are used and connected as illustrated in FIG. 2, a fully redundant network fabric is created between each DSU 220A-D and each Area Distribution Box (ADB). The number of DSU-D2 units determines the network bandwidth for the system 200 (with each DSU-D2 typically contributing an equal portion).

A common method for loading media programs into an IFE system, such as the iSeries system, is with a data loading device, such as a Portable Data Loader (PDL). A PDL is itself a digital server with network performance typically equal to that provided by the DSUs 220A-D.

In the embodiment of FIG. 2, the IFE system includes an interface to the system to which a PDL can be connected. Examples of appropriate interfaces include a direct disk interface (such as SCSI), a storage network interface (such as Fibre Channel), or a network interface (such as 100BaseT or 1000BaseF). For example, a laptop computer could be used as a portable data loader if the amount of material is relatively small. Laptops can easily accommodate storage of around 5 Gbytes and can easily utilize a 100BaseT Ethernet at a rate around 10 Mbps. A high performance loader can be used as portable data loader if the amount of material is relatively large. The loader can be built with as much capacity as required and can be designed to provide optimum performance as a loader. The interface from the Portable Data Loader could consist of one or more interfaces, such as 100BaseT, 1000BaseF, Ultra 2 SCSI-2, Ultra 160 SCSI or Fibre Channel.

Alternative embodiments for a data loading device may include a hardware replacement device that permits content on the IFE system to be updated or changed by exchanging hardware loaded with the old material with hardware loaded with new material. This can consist of replacing a complete server or replacing the storage element of a server, e.g. removable hard disk drives or portable media. Another alternative is to permanently install a load device in the aircraft, which can be used to update material while the aircraft is flying. This has the advantage of being able to significantly extend the time available for loading material, while minimizing the time required of maintenance personnel. It has the disadvantage of requiring the aircraft to carry the weight of the loader whether it is being used or not. The load process uses two components, the load device permanently installed in the aircraft and the portable component containing the new material. The portable component may include Digital Audio Tape (DAT), Digital Linear Tape (DLT), Compact Disk or Digital Versatile Disk (CD/DVD), Hard Disk Drives, or an intelligent loader.

Figure 3:
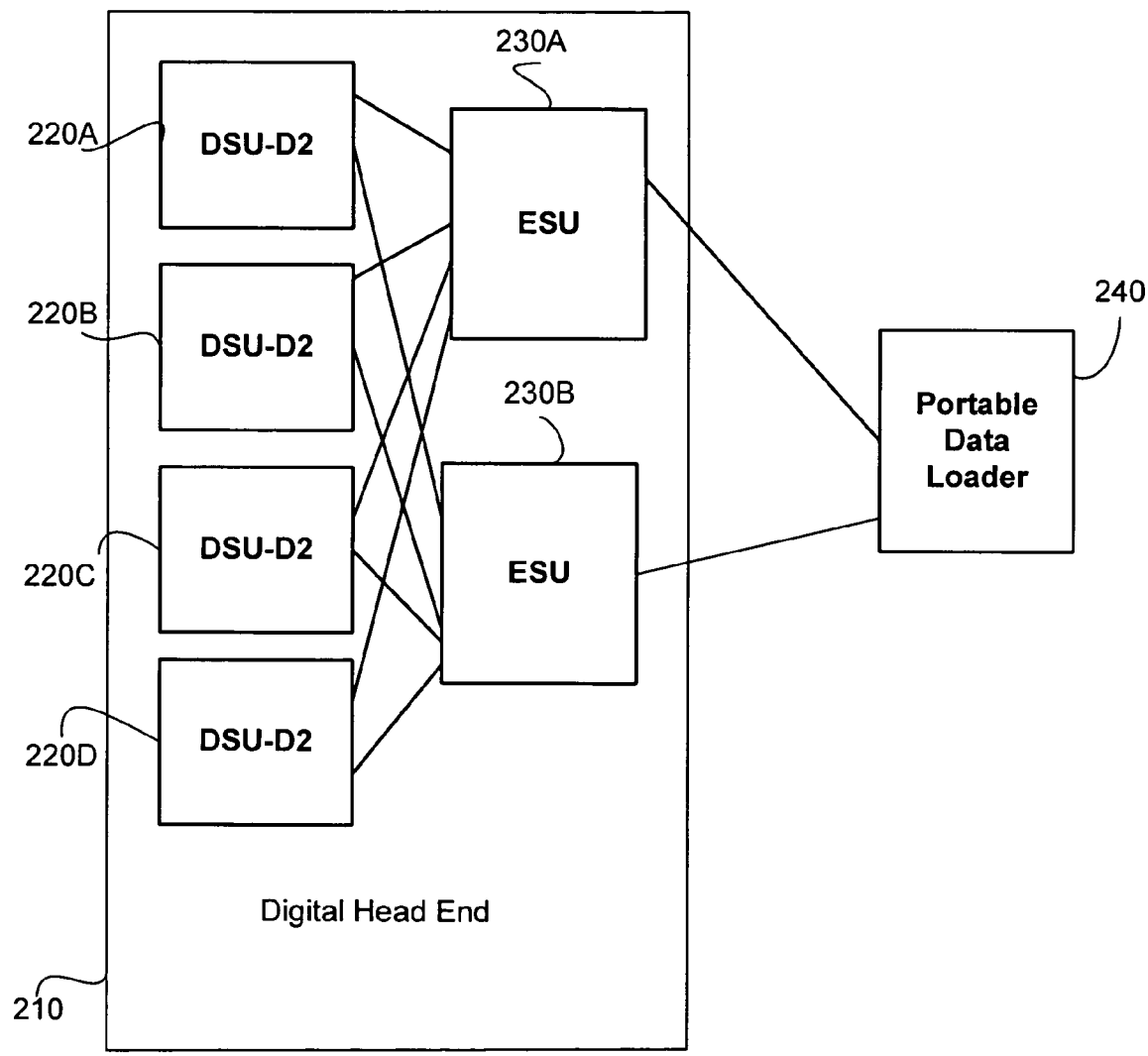
FIG. 3 is a functional block diagram illustrating connection of a portable data loader device to a network of content servers and network servers.

To load media programs into an IFE system, a PDL 240 is connected to ESUs 230A and B as illustrated in FIG. 3. Like DSUs 220A-D, in this exemplary embodiment, PDL 240 provides two independent network interface connections, each of which is connected to one of ESUs 230A-B. This approach permits the network bandwidth for transfers from PDL 240 to be essentially equal to that of each of the DSUs 220A-D.

For the purposes of this description, it will be assumed that there is no material currently loaded onto DSUs 220A-D and that a complete load of material from the Portable Data Loader (PDL) 240 is required. In order to simplify the explanation, it is further assumed that all program materials are the same size and that all the program material will be loaded onto all of the DSUs 220A-D. In a typical, real world situation, there is usually some material that is already loaded onto the DSUs and is to remain on the servers and it is also practical to operate the system with different servers having different media. This simplified scenario is offered for purposes of illustration only and the present invention is not limited to the example given.

Figure 4:
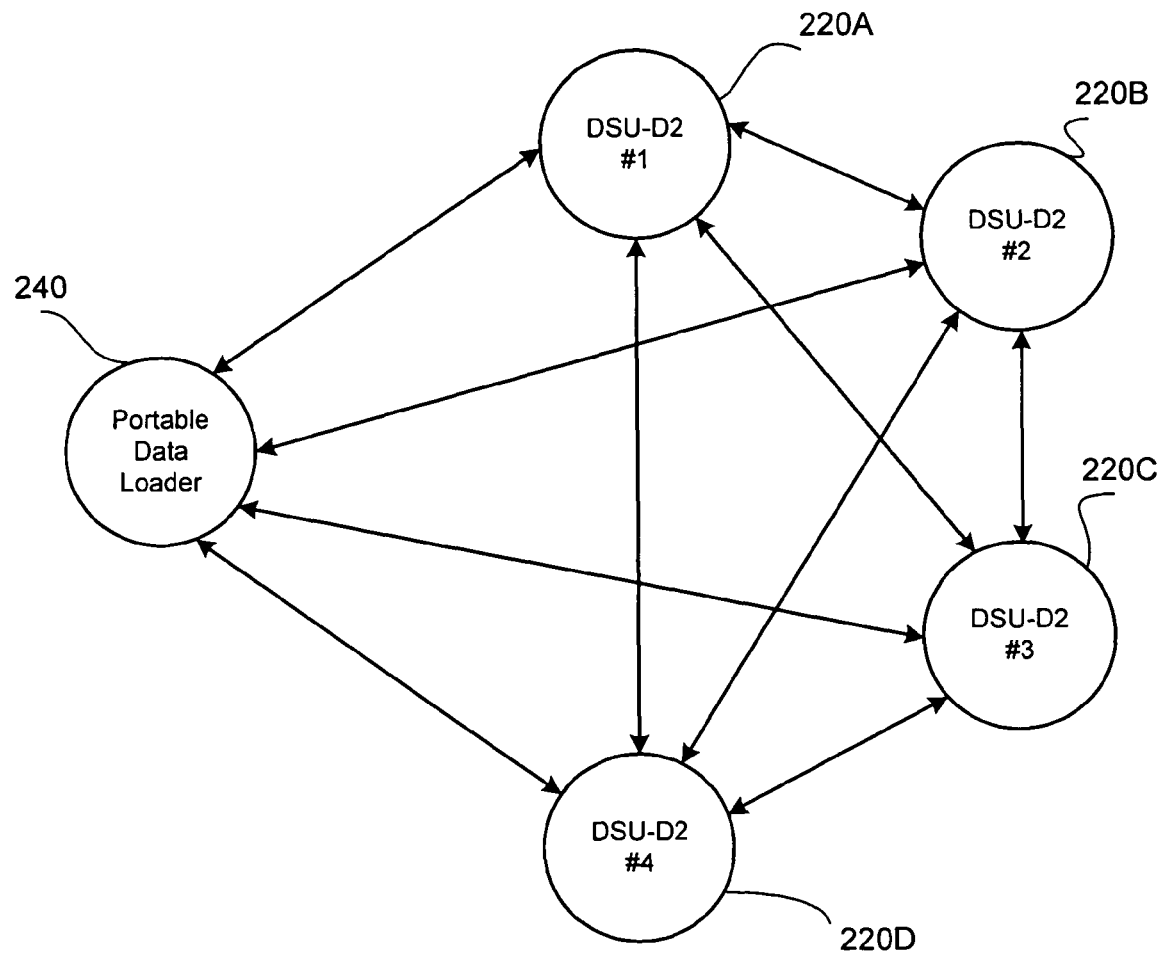
FIG. 4 is a message flow diagram illustrating a flow of messages, according to one embodiment of the present invention, for transfer of files between the data loader and content servers of FIG. 3.

In one embodiment of a media load process according to the present invention, a list of desired media programs is provided to each DSU from the PDL. Each DSU is then responsible for obtaining each of the desired media programs identified in the list from another server, where the PDL is considered a server. In a preferred embodiment, the list indicates the order in which the media programs are to be loaded and the server or servers from which the media program is to be obtained. In this exemplary embodiment, the standard Internet "File Transfer Protocol" (FTP) is used to copy the files, as is well understood in the art. FIG. 4 illustrates the logical transfers of media programs between PDL 240 and DSUs 220A-D.

For the purposes of the present illustration, it is assumed that there is a list of equal size media programs to be loaded from PDL 240 into DSUs 220A-D. It is also assumed that each of DSUs 220A-D and PDL 240 has equal performance and that the maximum number of simultaneous transfers from each server is four, which simplifies the illustration. The load process of the present invention, in this exemplary embodiment, is performed in three phases.

Figure 5:
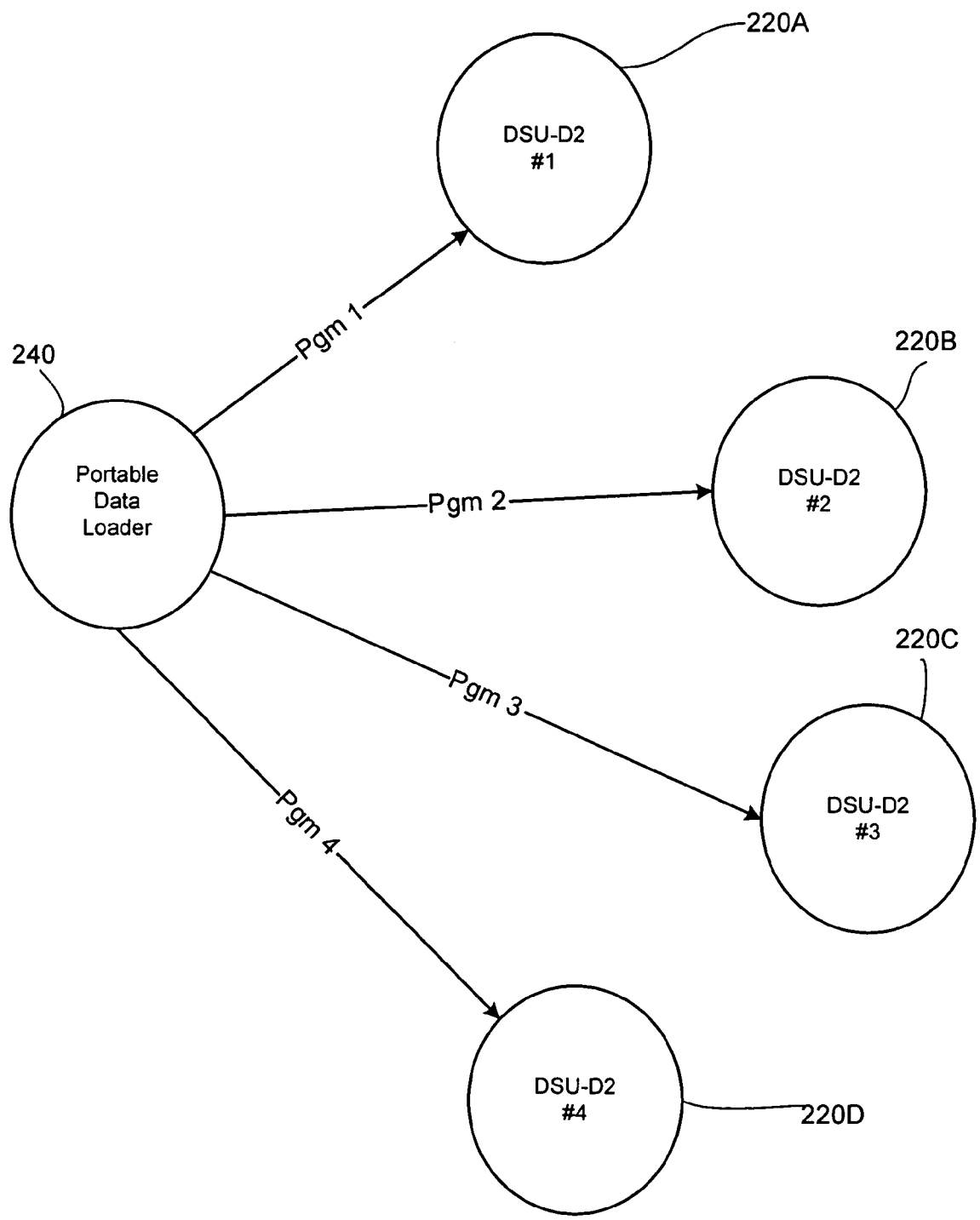
FIG. 5 is a data flow diagram illustrating an example of a first phase of a loading process for the example of FIG. 3, in accordance with one embodiment of the present invention.

In phase one, a first set of programs is loaded, as illustrated in logical terms in FIG. 5. In this initial phase, there is only one potential source for the desired media programs, which is Portable Data Loader (PDL) 240. Therefore, the file transfers are from PDL 240 to DSUs 220A-D. Each DSU 220A-D starts transferring a different program from PDL 240. In the example shown in FIG. 5, program 1 is transferred to DSU 220A, program 2 is transferred to DSU 220B, program 3 is transferred to DSU 220C, and program 4 is transferred to DSU 220D. During this phase, it is not possible for a DSU to get any material from any other DSU.

In a second phase of the media program load, each of the DSUs 220A-D have media programs stored on them that can be cross-loaded to other DSUs. Once a media program is completely loaded onto a DSU, it can be made available to other DSUs for loading. This cross-load technique permits each server to increase the data throughput for loading purposes by combining transfers from PDL 240 with transfers between DSUs 220A-D.

Figure 6:
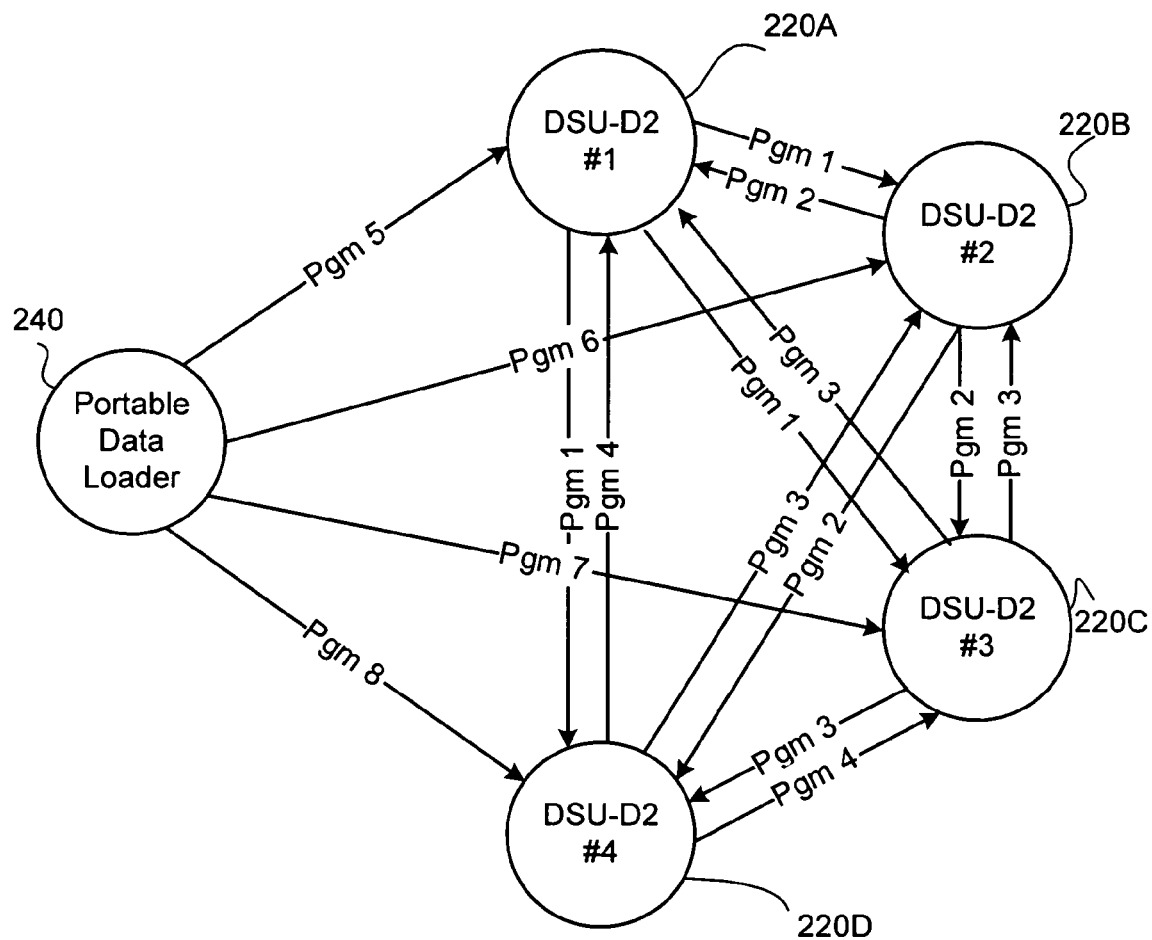
FIG. 6 is a data flow diagram illustrating an example of simultaneous loading of data from a portable data loader and, at the same time, the cross-loading of data between content servers during a second phase of a loading process according to one embodiment of the present invention.

FIG. 6 is a data flow diagram illustrating an example of how the system of the present invention permits the simultaneous loading of data from PDL 240 and, at the same time, the cross-loading of data between DSUs 220A-D during a second phase of the loading process. Using this technique, each server can utilize its maximum data throughput combining transfers from the PDL and transfers from other DSUs using the high performance network fabric. In FIG. 6, PDL 240 transfers programs 5-8 to DSUs 220A-D, respectively. Meanwhile, DSUs 220A and 220B cross-load programs 1 and 2, DSUs 220A and 220C cross-load programs 1 and 3, and DSUs 220A and 220D cross-load programs 1 and 4. Also, DSUs 220B and 220C cross-load programs 2 and 3 and DSUs 220B and 220D cross-load programs 2 and 4. Finally, DSUs 220C and 220D cross-load programs 3 and 4. In this example, at the end of phase two, programs 1-4 have been cross-loaded and reside in all of DSUs 220A-D while programs 5-8 reside in DSUs 220A-D, respectively.

Figure 7:
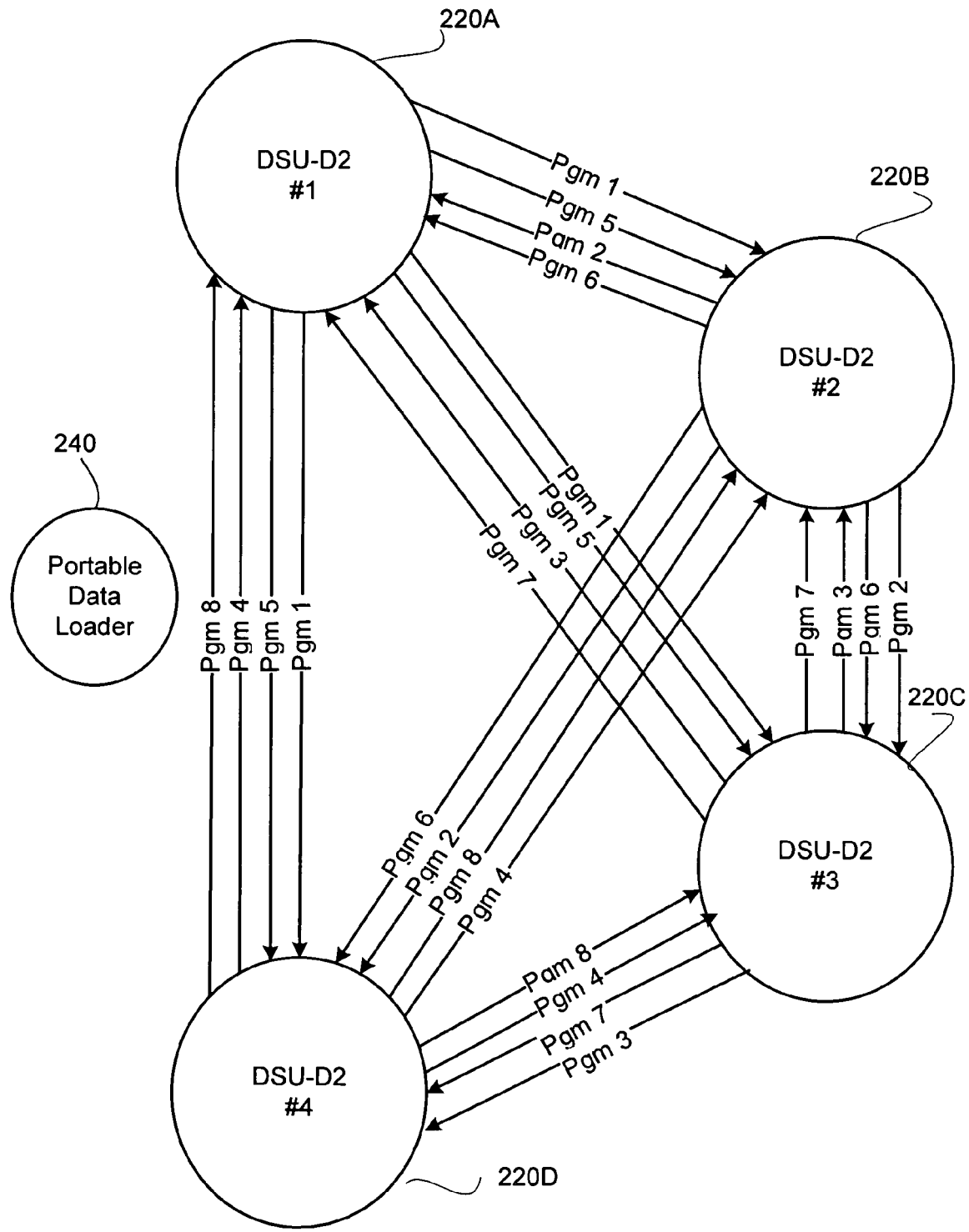
FIG. 7 is a data flow diagram illustrating an example of final phase of a loading process, according to one embodiment of the present invention, wherein the content servers complete the loading process by cross-loading files to one another.

In a final phase of the loading process in the present example, cross-loading between the DSUs is completed. At this point, in this example, one copy of the each desired program has been downloaded from PDL 240 to at least one DSU and the PDL is no longer needed because the material has been obtained from the PDL and the system is fully capable of completing the system loading by continuing to cross load the material between the DSUs. FIG. 7 illustrates an example of how the system can complete the cross load process. Note that the PDL may be removed from the aircraft once the initial program copy is complete. In the final phase, DSUs 220A and 220B cross-load programs 5 and 6, DSUs 220A and 220C cross-load programs 5 and 7, and DSUs 220A and 220D cross-load programs 5 and 8. At the same time, DSUs 220B and 220C cross-load programs 6 and 7 and DSUs 220B and 220D cross-load programs 6 and 8. Also, DSUs 220C and 220D cross-load programs 7 and 8. By the end of the final phase, in this example, each of DSUs 220A-D contain each of media programs 1-8.

In the example described above, PDL 240 serves as a source for the media programs 1-8 and each DSU 220A-D both receives and sends media programs during the media load process. In the example, a specific set of file transfers are executed to perform a media load. As illustrated in Table 1, twenty-one file transfers are required for each DSU in order to load twelve media programs into the four DSUs 220A-D in the example above. In fact, the following formula can be used to determine how many DSU transfers are required for any number of media programs and servers:

$$N=2P-P/S$$

Where
N=Total number of transfers required for each Server
P=Total number of media programs to be transfers
S=Total number of servers to be loaded Note that as the number of servers increases, the total number of transfers required will approach an upper limit of:

$$N=2P$$

which is independent of the number of servers. Thus, the approach of the present invention better uses the network bandwidth available to each DSU. Consequently, the time required to load a number of servers does not generally exceed twice the time to load one server, even if there are twelve or more servers to be loaded.

The order, source, and priority of the file transfers can also improve the performance of the media load. The theoretical limit of N=2P generally requires that all of the bandwidth of all of the DSUs is utilized for the media load including cross-loading. To increase bandwidth usage, each DSU 220A-D may be provided with a file transfer script that is coordinated with the other DSUs. Table 2 presents an example of such a DSU script process.

Another embodiment of a content loading process, in accordance with the present invention, is based on a pull-based approach, wherein a server initiates file transfers from a source (e.g. DSUs perform an FTP get request from a load device) rather than a loader push approach. A pull approach requires that each server have information about which media programs it needs to load and where those media programs are located on the system. Table 2 illustrates an example of a set of scripts for content loading a set of twelve media programs 1-12. In this embodiment, the scripts shown in Table 2 is downloaded from PDL 240 to DSUs 22A-D and the DSUs, under control of the scripts, begin the content loading process.

TABLE 1

Data Transfers Required for Complete Load of 12 Media Programs

| PDL | DSU-D2 # 1 | DSU-D2 # 2 | DSU-D2 # 3 | DSU-D2 # 4 |
|---|---|---|---|---|
| Send Pgm 1 - D1 | Get Pgm 1 - PDL | Get Pgm 2 - PDL | Get Pgm 3 - PDL | Get Pgm 4 - PDL |
| Send Pgm 2 - D2 | Get Pgm 5 - PDL | Get Pgm 6 - PDL | Get Pgm 7 - PDL | Get Pgm 8 - PDL |
| Send Pgm 3 - D3 | Get Pgm 9 - PDL | Get Pgm 10 - PDL | Get Pgm 11 - PDL | Get Pgm 12 - PDL |
| Send Pgm 4 - D4 | Send Pgm 1 - D2 | Send Pgm 2 - D1 | Send Pgm 3 - D1 | Send Pgm 4 - D1 |
| Send Pgm 5 - D1 | Send Pgm 1 - D3 | Send Pgm 2 - D3 | Send Pgm 3 - D2 | Send Pgm 4 - D2 |
| Send Pgm 6 - D2 | Send Pgm 1 - D4 | Send Pgm 2 - D4 | Send Pgm 3 - D4 | Send Pgm 4 - D3 |
| Send Pgm 7 - D3 | Get Pgm 2 - D2 | Get Pgm 1 - D1 | Get Pgm 1 - D1 | Get Pgm 1 - D1 |
| Send Pgm 8 - D4 | Get Pgm 3 - D3 | Get Pgm 3 - D3 | Get Pgm 2 - D2 | Get Pgm 2 - D2 |
| Send Pgm 9 - D1 | Get Pgm 4 - D4 | Get Pgm 4 - D4 | Get Pgm 4 - D4 | Get Pgm 3 - D3 |
| Send Pgm 10 - D2 | Send Pgm 5 - D2 | Send Pgm 6 - D1 | Send Pgm 7 - D1 | Send Pgm 8 - D1 |
| Send Pgm 11 - D3 | Send Pgm 5 - D3 | Send Pgm 6 - D3 | Send Pgm 7 - D2 | Send Pgm 8 - D2 |
| Send Pgm 12 - D4 | Send Pgm 5 - D4 | Send Pgm 6 - D4 | Send Pgm 7 - D4 | Send Pgm 8 - D3 |
| | Get Pgm 6 - D2 | Get Pgm 5 - D1 | Get Pgm 5 - D1 | Get Pgm 5 - D1 |
| | Get Pgm 7 - D3 | Get Pgm 7 - D3 | Get Pgm 6 - D2 | Get Pgm 6 - D2 |
| | Get Pgm 8 - D4 | Get Pgm 8 - D4 | Get Pgm 8 - D4 | Get Pgm 7 - D3 |
| | Send Pgm 9 - D2 | Send Pgm 10 - D1 | Send Pgm 11 - D1 | Send Pgm 12 - D1 |
| | Send Pgm 9 - D3 | Send Pgm 10 - D3 | Send Pgm 11 - D2 | Send Pgm 12 - D2 |
| | Send Pgm 9 - D4 | Send Pgm 10 - D4 | Send Pgm 11 - D4 | Send Pgm 12 - D3 |
| | Get Pgm 10 - D2 | Get Pgm 9 - D1 | Get Pgm 9 - D1 | Get Pgm 9 - D1 |
| | Get Pgm 11 - D3 | Get Pgm 11 - D3 | Get Pgm 10 - D2 | Get Pgm 10 - D2 |
| | Get Pgm 12 - D4 | Get Pgm 12 - D4 | Get Pgm 12 - D4 | Get Pgm 11 - D3 |

Note that the N=2P limit applies when the full bandwidth of each server can be fully utilized. As was indicated in the earlier discussion, during Phase One of the media load, material is initially obtained from PDL 240 (i.e. because there is nothing to cross load between the DSUs 220A-D). This modification is factored into the data in Table 2, which sets forth an example of a set of transfers resulting in the twelve programs to be transferred in the equivalent time of twenty-four file transfers even with the delay imposed by the Phase One load.

The examples discussed above are simplified by the assumption that all the media programs are of equal length, which is typically not true in a real-world situation. One refinement of the technique of the present invention is to reduce the penalty of the Phase One Media Load by having the first set of programs be shorter (e.g. smaller data amount) programs. Once a complete program is loaded into a DSU, then it is available for cross loading into other DSUs. Thus, the Phase One penalty may be reduced to the length of the shorter programs.

In the example shown in Table 2, PDL 240 initially downloads media programs 1-4 to DSUs 220A-D, respectively, and there are Get commands in each of the DSUs corresponding to the Send operations in PDL 240. For example, DSU #D1, e.g. DSU 220A, has Get command <Get Pgm 1-PDL> that indicates a get operation for media program one from PDL 240, where the Get command includes an identifier for media program one (represented here as Pgm 1), a network address for PDL 240 (represented here as PDL) and a network address for DSU 220A (represented here as D1). In this example, the Get command from DSU 220A to PDL 240 results in PDL 240 sending media program one to the network address D1 for DSU 220A, e.g. Send Pgrm2-D1. Similar commands result in the download of media programs 2, 3 and 4 to DSUs 220B-D, respectively. Since each of these programs must be obtained from PDL 240, they execute sequentially.

In the following phase, media programs 5-8 are downloaded from PDL 240 to DSUs 220A-D, respectively, in a manner similar to that described above with respect to media programs 1-4. The download from PDL 240 is followed by cross-loading of media programs between DSUs. In Table 2, the script for DSU 220B calls for cross-loading media program 1 from DSU 220A, e.g. <Get Pgm 1-D1>, which results in the cross-load from DSU220A, e.g. <Send Pgm 1-D2>. At the same time, the script for DSU 220D calls for cross-loading media program 3 from DSU 220C, e.g. <Get Pgm 3-D3>, which results in the cross-load from DSU220C, e.g. <Send Pgm 3-D4>. A next set of cross-loads in the scripts of Table 2 transfers media program 2 from DSU 220B to DSU 220A and media program 4 from DSU 220D to DSU 220C. And another set of cross-loads in the present phase transfers media program 1 from DSU 220A to DSU 220C and media program 2 from DSU 220B to DSU 220D.

In the next phase, media programs 9-12 are downloaded from PDL 240 to DSUs 220A-D, respectively. At this point, all of the media programs required from PDL 240 have been transferred to DSUs 220A-D and the DSUs can complete content loading on their own. Consequently, PDL 240 may be disconnected from the IFE system once the new content, e.g. media programs 9-12, has been downloaded to the DSUs. The DSUs subsequently cross-load media programs on the basis of the scripts until all twelve media programs, in this example, reside on all four DSUs 220A-D. In this example, it is possible to download and cross-load all the media programs to all the DSUs in thirty transfer cycles.

be coordinated in order to make better use of the available bandwidth between DSUs. The scripts may be developed by a programmer or operator or may be automatically generated based on the content to be downloaded. For instance, the architecture of the IFE system may be uploaded to the PDL, which contains a process for generating the scripts based on the content and the IFE system structure. Other approaches are possible, such as the use of a file that identifies the desired content that is downloaded to each DSU and the DSU is configured to search out and cross-load the desired content.

One exemplary embodiment of a file that may be used to identify and define the content that is to be loaded onto an IFE system is a Content Inventory List (CIL). The purpose of the CIL is to define what content is to be loaded and where it is to be loaded. An example of a CIL 250 is provided in FIG. 8, wherein content and server groups are defined. In the example of FIG. 8, a field definition identifies the type, identifier, filename, CoFilename, title, length, rights and server for content in the CIL. The <Type> field identifies the type of content, e.g. a movie, audio program, website or game. The <ID> field contains an identifier for the content that links the content to another type of SIF file, which is discussed below, that affects the presentation of the content. The <Filename> field identifies the file name of the content on the load source, e.g. on PDL 240 or DSUs 220A-D. The <CoFilename> field

TABLE 2

Media Transfers to be Performed - 12 Programs, 4 Servers, ×4 Transfer Rate

| | PDL (240) | DSU # D1 (220A) | DSU # D2 (220B) | DSU # D3 (220C) | DSU # D4 (220D) |
|---|---|---|---|---|---|
| 1 | Send Pgm 1 - D1 | Get Pgm 1 - PDL | Get Pgm 2 - PDL | Get Pgm 3 - PDL | Get Pgm 4 - PDL |
| | Send Pgm 2 - D2 | | | | |
| | Send Pgm 3 - D3 | | | | |
| | Send Pgm 4 - D4 | | | | |
| 2 | Send Pgm 5 - D1 | Get Pgm 5 - PDL | Get Pgm 6 - PDL | Get Pgm 7 - PDL | Get Pgm 8 - PDL |
| | Send Pgm 6 - D2 | Send Pgm 1 - D2 | Get Pgm 1 - D1 | Send Pgm 3 - D4 | Get Pgm 3 - D3 |
| | Send Pgm 7 - D3 | Get Pgm 2 - D2 | Send Pgm 2 - D1 | Get Pgm 4 - D4 | Send Pgm 4 - D3 |
| | Send Pgm 8 - D4 | Send Pgm 1 - D3 | Send Pgm 2 - D4 | Get Pgm 1 - D1 | Get Pgm 2 - D2 |
| 3 | Send Pgm 9 - D1 | Get Pgm 9 - PDL | Get Pgm 10 - PDL | Get Pgm 11 - PDL | Get Pgm 12 - PDL |
| | Send Pgm 10 - D2 | Get Pgm 3 - D3 | Get Pgm 4 - D4 | Send Pgm 3 - D1 | Send Pgm 4 - D2 |
| | Send Pgm 11 - D3 | Send Pgm 1 - D4 | Send Pgm 2 - D3 | Get Pgm 2 - D2 | Get Pgm 1 - D1 |
| | Send Pgm 12 - D4 | Get Pgm 4 - D4 | Get Pgm 3 - D3 | Send Pgm 3 - D2 | Send Pgm 4 - D1 |
| 4 | | Send Pgm 5 - D2 | Get Pgm 5 - D1 | Send Pgm 7 - D1 | Get Pgm 5 - D1 |
| | | Get Pgm 6 - D2 | Send Pgm 6 - D1 | Get Pgm 5 - D1 | Send Pgm 8 - D1 |
| | | Send Pgm 5 - D3 | Get Pgm 7 - D3 | Send Pgm 7 - D2 | Get Pgm 6 - D2 |
| | | Get Pgm 7 - D3 | Send Pgm 6 - D3 | Get Pgm 6 - D2 | Send Pgm 8 - D2 |
| 5 | | Send Pgm 5 - D4 | Get Pgm 8 - D4 | Send Pgm 7 - D4 | Get Pgm 7 - D3 |
| | | Get Pgm 8 - D4 | Send Pgm 6 - D4 | Get Pgm 8 - D4 | Send Pgm 8 - D3 |
| | | Send Pgm 9 - D2 | Get Pgm 9 - D1 | Send Pgm 11 - D1 | Get Pgm 9 - D1 |
| | | Get Pgm 10 - D2 | Send Pgm 10 - D1 | Get Pgm 9 - D1 | Send Pgm 12 - D1 |
| 6 | | Send Pgm 9 - D3 | Get Pgm 11 - D3 | Send Pgm 11 - D2 | Get Pgm 10 - D2 |
| | | Get Pgm 11 - D3 | Send Pgm 10 - D3 | Get Pgm 10 - D2 | Send Pgm 12 - D2 |
| | | Send Pgm 9 - D4 | Get Pgm 12 - D4 | Send Pgm 11 - D4 | Get Pgm 11 - D3 |
| | | Get Pgm 12 - D4 | Send Pgm 10 - D4 | Get Pgm 12 - D4 | Send Pgm 12 - D3 |

Note that it may be advantageous for the content loading system discussed above to load and contain content that is not necessarily active, such as the current month and next month's movies, and the ability to use a subset of the content based on a criteria. Typically, this would be a month designation, e.g. having and using January material while February material is also loaded. Similarly, it would be helpful to have the capability to switch criteria for content use, such as through an operator selection. It may also be advantageous to support different content on different kinds of servers, such as servers have specialized gaming or video capability.

The example discussed above with regard to Table 2 contemplates the use of scripts that define the content to be transferred and the order of transfer so that the transfers can provides the file name for associated data on the load source. The <Title> field provides a textual name for the content, e.g. the title of the movie "Matrix". The <Length> field provides the playing time in minute of the content. The <Rights> field defines the restrictions on use for the content, e.g. which month the content may be accessed. The <Server> field defines the server or server group to which the content is to be loaded or located, e.g. server group "SG1".

In the embodiment shown, video content (e.g. the <Type> field is "V") includes a Motion Picture Engineering Group standard (MPEG) file (.mpg) identified in the <Filename> field, and an associated data file (.tgz), identified in the <CoFilename> field. The associated data file (.tgz) contains meta data, an install script (including SQL install) and an uninstall script (including SQL delete) relating to the content of the MPEG file. For clarity, the MPEG file and associated data file have the same initial character identifier and the same base file name with a different file extension. Similarly, Broadcast Audio files (e.g. the <Type> field is "A") have multiple MPEG3 (MP3) files (.mp3), and a single associated data file (.tgz). The associated data file contains the information necessary to provide the channel selection information for the interactive graphical user interface (GUI) to the system. Audio on Demand (AOD) files consist of multiple audio track files (.mpg) and a single associated data file (.tgz). The associated data file (.tgz) will contain the meta data, install script and uninstall script similar to that indicated for movies. Game files (e.g. the <Type> field is "G") include a game file (.tgz) that contains the actual game files (e.g. .out, .res), the meta data for interactive menus, an install script, and an uninstall script. The meta data and install/uninstall scripts are used to create the GUI menus for the games. Another type of content, web sites, are typically composed of a single site file (.tgz), which contains all of the files associated with the web site, an install script, an uninstall script, and meta data appropriate to connect the site into the GUI menu.

The example CIL of FIG. 8 includes examples of entries describing content. For example, the following entries relate to a January section:

V, 10101, 50001.mpg, 50001.tgz, "Pretty Woman", 116, Jan, SG5
V, 10102, 50432.mpg, 50432.tgz, "Batman Returns", 127, Jan, SG5
A, 20101, 50101.mp3, 50101.tgz, "Come On Over", 3.43, Jan, SG1

The first of these entries describes video content, e.g. "V", with an ID value of 10101 for files 50001.mpg, e.g. an MPEG file, with an associated file 50432.tgz. The video content is titled "Pretty Woman", 116 minutes long, available in January, e.g. "Jan", and is to be distributed to server group "SG5", which is defined elsewhere in the CIL and is described below. Similarly, a second video "Batman Returns" is 127 minutes in run-time length, will be made available in January, and is to be distributed to server group SG5. Also, an audio file titled "Come On Over" is 3.43 minutes in length, available in January and distributed to server group SG1. The CIL of FIG. 8 also includes February content and unrestricted content. The CIL of FIG. 8 includes game content defined by two entries: G, PakMan.tgz, "Packman", SG4; and G, PakMan.gam, "Packman", SG6.

Server groups are also defined in the CIL, wherein the servers belonging to each server group are identified. The name of the server group is followed by name or network address of the server. In the example shown in FIG. 8, server group "SG1" includes one server with the name "DSU18260-1". Server group "SG4", by comparison, includes four servers with names "DSU-D2-1", "DSU-D2-2", "DSU-D2-3", "DSU-D2-4", which correspond to DSUs 220A-D, respectively, in this example. The server group definition specified in the <Server> field for a particular content field definition, identifies the servers on which the content is to be located.

In this exemplary embodiment, a system inventory file (SIF) specifies how content is used for broadcast style services (e.g. broadcast video, audio, overhead video, PRAM, BMM, etc.). Interactive operation is specified by the metadata provided for each piece of content and is not defined in the CIL or SIF. In this example, the SIF merely defines how a file is to be used, e.g. broadcast availability, interactive content, etc., and does not change when content changes. The CIL connects actual content files to a logical content item, such as logically connecting a movie file to Movie 1 or Movie 2. The CIL establishes that Movie 1 is, for example, filename 50001.mpg and the SIF defines how to use Movie 1. When the CIL is invoked, it establishes a link so that references to "Movie 1" actually connect to file 50001.mpg, which corresponds to "Pretty Woman" in the example shown in FIG. 8.

Figure 9:
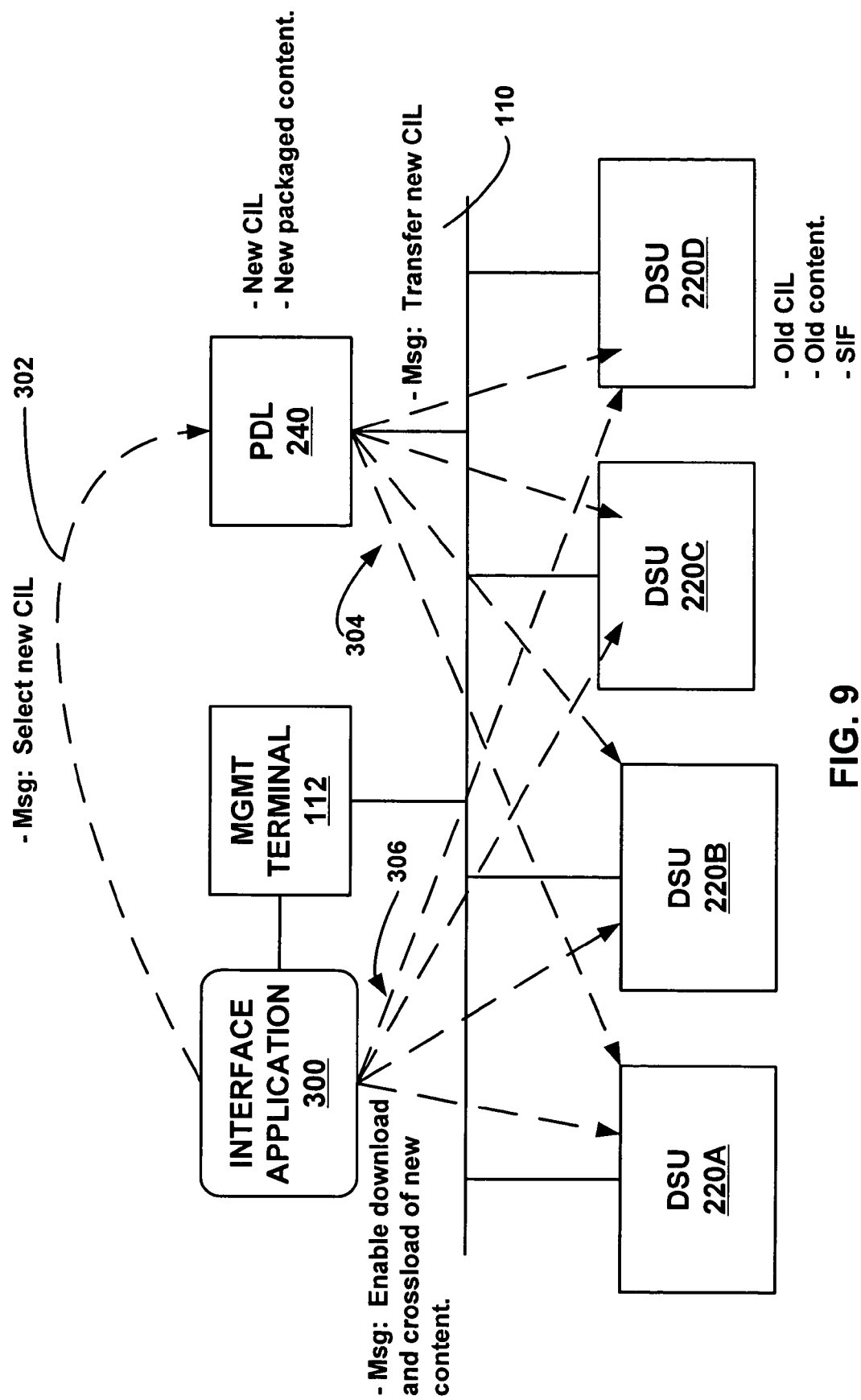
FIG. 9 is a functional block diagram illustrating one embodiment of an approach to controlling the content loading process, in accordance with the present invention, using an interface application on a management terminal.

FIG. 9 is a functional block diagram illustrating one embodiment of an approach to controlling the content loading process. In this approach, an interface application 300 on management terminal 112 is used to initiate and control content download from PDL 240 to and among DSUs 220A-D. In an alternative embodiment, the interface application can reside on PDL 240 or another device connected to the IFE system. A preferred embodiment of interface application 300 is a content load web-site that provides for the management and performance of the content loading process.

In an embodiment of a web-site interface application, the site provides a web page that identifies a current CIL in use on the IFE system and identifies alternate CILs available, e.g. stored on PDL 240. The web page permits the selection and activation of an alternate CIL. Typically, the selection of an alternate CIL is a maintenance function requiring the system to be in maintenance mode (i.e. not service mode). When an alternate CIL is activated, then the appropriate processes are performed to cause the new content to be used when entertainment services are started. In one embodiment, there are logical file links between programs names contained in an SIF and the current files being used. When content selection is changed, the SIF is not changed, but the new content is linked instead of the old content.

In one embodiment of the present invention, operator action is used to cause the content loading process to begin removing content that is no longer required and obtaining content that is required but is not yet present on the DSUs. In an alternative embodiment, the system may permit automatic activation of the content loading process so that, for example, a server without content can cross-load from servers with the content during flight. It may remain advantageous, in this instance, to require operator action to enable the background load process so that undesirable side effects can be avoided. If a load process is activated, the interface screen can provide feedback concerning progress or status of the loading process.

Figure 10:
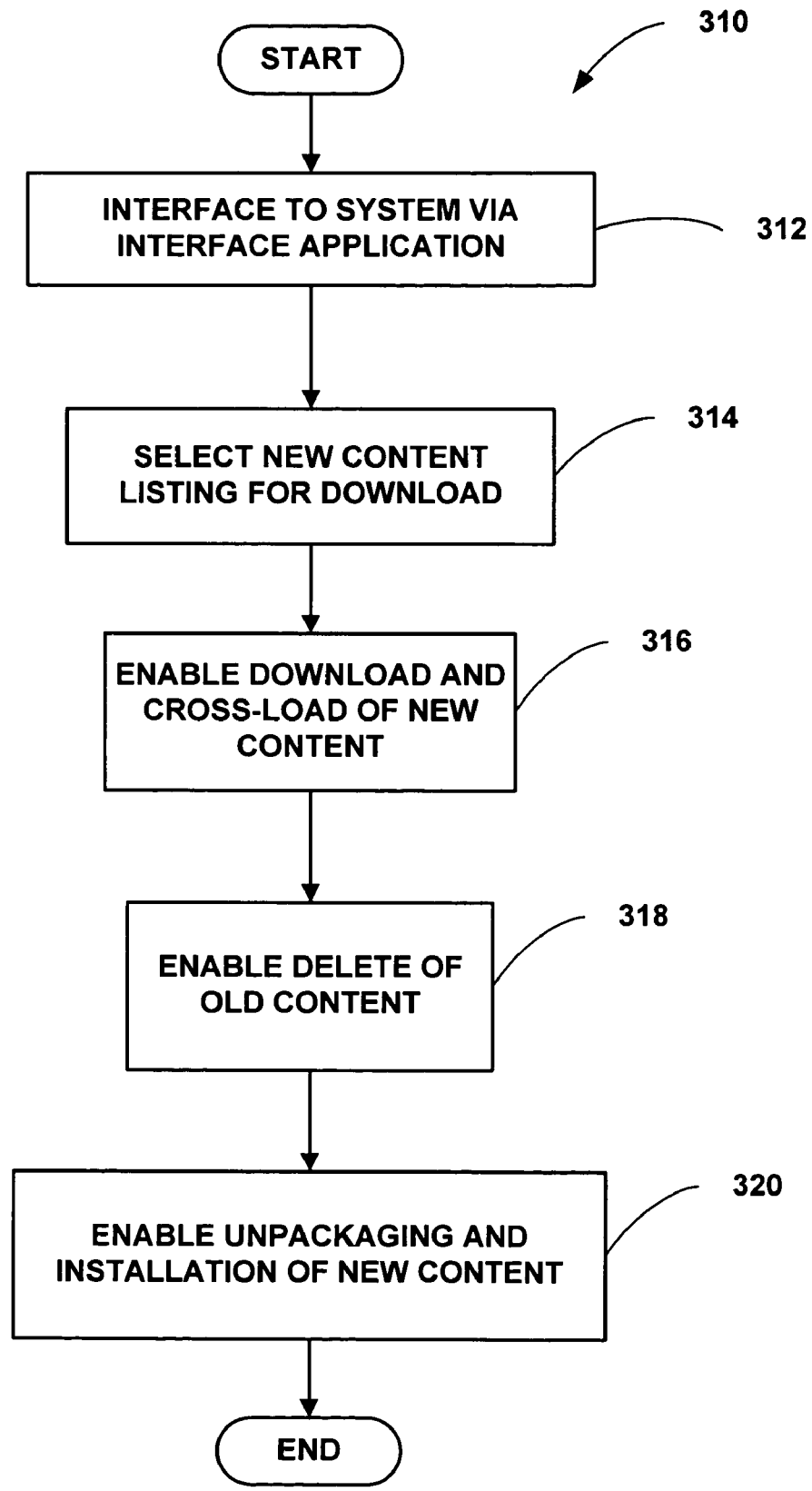
FIG. 10 is a control flow diagram illustrating one embodiment of a process, according to the present invention, performed using the interface application of FIG. 9 to manage data download.

In the exemplary embodiment of FIG. 9, interface application 300 permits a technician or other user to select a new CIL on PDL 240 for download to DSUs 220A-D. FIG. 10 is a control flow diagram illustrating one embodiment of a process 310 performed using interface application 300 to manage data download. PDL 240 includes storage that contains one or more new CILs along with new content, which is preferably packaged in a compressed format. In this embodiment, the technician accesses the system via the interface application 300 (step 312), selects a new CIL via interface application 300 (step 314) and the selection is communicated to PDL 240 via a message 302. In response to the selection message 302, PDL 240 downloads the selected CIL to DSUs 220A-D through further messages 304 to the DSUs, which, in this example, store an old CIL pertaining to old content along with SIFs. Once the selected CIL has been transmitted to the DSUs, interface application 300 is used to enable (step 316) the download and crossload process on the DSUs, which begin to download and crossload content as described above. Once content has been loaded onto a server, the technician enables the old content to be deleted (step 318) and enables the new content to be unpackaged and installed (step 320). It may be advantageous, if storage space permits, to enable and verify the successful unpacking of new content before enabling the deletion of the old content.

Another function that may be performed using the interface application 300 of FIG. 9 is criteria selection for purposes of determining the content that is accessible by passengers. As illustrated in the example of FIG. 8, content for different months can be present at the same time, e.g. January and February. This permits the pre-loading of content that is not yet in use. In one embodiment of interface application 300, a criteria selection screen identifies to an operator the available selections (e.g. January Content and February Content) and permits the operator to change the selection. When the selection is changed, which is preferably performed while in a maintenance mode, the new set of file links and flags for broadcast and interactive service are activated and the SIF permits access to the new content. For instance, if the video "Pretty Woman" is the first movie selection available for January and the criterion selection is changed to February, then the files or links for the video "A Time For Us", e.g. 54032.mpg, are substituted for those of "Pretty Woman", e.g. 50001.mpg, and the first movie selection is linked to "A Time For Us".

Note that the content is preferably loaded from the PDL in packaged form and cross-loaded from server to server in packaged form. The content inventory list (CIL) refers to the content in packaged form. Also, content is preferably stored on the PDL and on each server in a specific directory. For example, a DSU, such as a DSU-D2, may have two mounted drives, so content gets stored in one of two directories. Once loaded, the content and associated data files typically remain in the initial load location. This facilitates cross loading as the packaged files are in fixed, known locations.

In another embodiment of the present invention, the servers may perform the download without the use of a script. For example, the each file definition in the CIL may include an identifier, logical or actual, for a server that will download the file and act as the source of the file to the other servers in the system. In this example, the file definition "V, 10101, 50001.mpg, 50001.tgz, "Pretty Woman", 116, Jan, SG5, DSU-D2-1" further indicates that DSU 220A, e.g. the server corresponding to the logical value "DSU-D2-1", is the server that will download the file from PDL 240.

Figure 11:
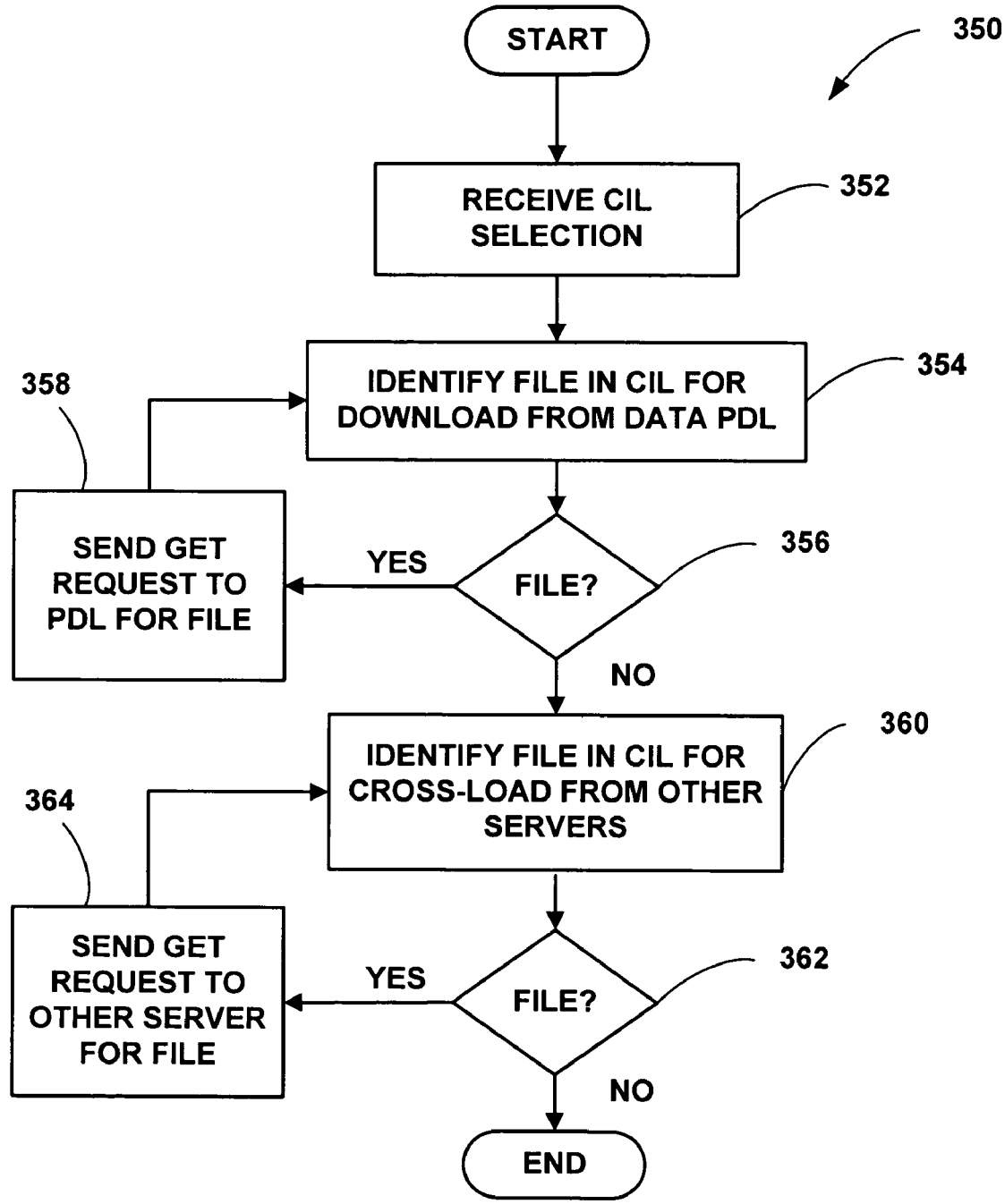
FIG. 11 is a control flow diagram illustrating another embodiment of a process, according to the present invention, for automatic download and cross-load of content on content servers using a modified content inventory list.

FIG. 11 is a control flow diagram illustrating one example of a process 350 for downloading and cross-loading content in one embodiment of the present invention. In process 350, at step 352, a server, e.g. DSU 220A-D, receives a CIL that includes file definitions that identify a server to receive the file, as discussed immediately above. At step 354, the DSU searches the CIL for files that identify it as the download server. If such a file is found, then control flow branches, at step 356, to step 358, where the DSU sends a get request to the PDL for the file. Control flow then returns to step 354 to identify any other file definitions for the DSU. This control loop continues until no further files identifying the particular DSU are found, whereupon control branches at step 356 to step 360.

At step 360, the cross-loading of files begins with the search of the CIL for file definitions with server groups that include the present DSU. If such a file definition is found, then control flow branches at step 362 to step 364, where the present DSU sends a get request for the file to the DSU identified as the download DSU in the file definition. Control flow then branches back to step 360 to find the next file definition with a server group that includes the present DSU. This control loop continues until get requests have been sent for all the file definitions with server groups that include the present DSU. Once process 350 has completed, the present DSU will have issued get requests to the PDL for all files for which it is the download server and to the other download servers for all other files that the CIL indicates it should store.

Other alternative approaches for download and cross-load are possible. For example, DSUs may self-identify as download servers based on a pseudo-random algorithm and then advertise their content on the network. In another example, a deterministic algorithm is applied by the DSUs to the file definitions in the CIL, e.g. the fourth DSU in the server group definition is the download server for each fourth file in the list of file definitions.

It may be useful to verify the integrity of the content in order to detect when content has been corrupted or incorrectly downloaded. One example, a file size check that compares the file size of the downloaded file to a downloaded value may be utilized. If the loaded file has the same size as the source file, then it may be considered good for use. Alternatively, a linear checksum may be performed as part of the load process. Such a checksum can be integrated into an existing process, such as a file transfer protocol (FTP) function, and not as a separate pass through the file. If a checksum process is introduced, an "expected checksum" source is provided to which the transfer checksum can be compared. Note that it is possible to append a checksum byte to any file consisting of the ones compliment of the file checksum which results in a "zero" checksum result and eliminates the need for an independent comparison value. An even more extensive check can be provided through a cyclic redundancy check, if desired.

It may also be advantageous to avoid attempting to cross-load partially complete content files. Problems may arise if a file is found on a first server, e.g. DSU, for cross-loading to another server before the file is completely downloaded to the first server. One approach to this issue is to have the load location and the cross-load location be different. In one embodiment, a cross-load location field in a database on the server is not filled with a link to the real file until the file is fully loaded and has been verified. For example, if a MPEG or MP3 file needs to be called out in a different directory or file location for use, then the file will be connected to that location with a file link rather than moving the file itself.

After a load is completed, the various associated material files (.tgz) are unpacked. The unpacking process may include locating the files in the appropriate locations on the server. After the files are unpacked into the appropriate locations, one or more install scripts may be executed to complete the content load. For example, the install scripts may place the appropriate database information into a SQL database on the server, e.g. place a link to the unpackaged file in a field in the database. The install scripts may also perform other actions necessary to locate and invoke the new material such as checking the size of the material, creating the file link to the MPEG or MP3 files, and creating links to a cross-load directory.

Deletion is generally performed by the loading process when a new CIL has been selected and the load process determines that there is content currently on the server that is not specified in the CIL. Deletion may involve removing the database records indicating the material is available and deleting all of the files associated with the content being deleted. To facilitate deletion, it may be useful to provide an uninstall script that removes the content information from the SQL database and removes all related files from the server system. It may also be useful for files, e.g. files for Movies, Broadcast Audio, AOD, and Games, to have a filename that begins with a common set of system unique characters. This can facilitate the deletion of this content by deleting all files that begin with these specific characters. The uninstall script can then simply specify a find and delete of everything that begins with the specified characters. For example, a web site that is provided as a content item, such as a third party website, may be specified to be loaded into a directory tree whose top directory name corresponds to a system unique identifier. The uninstall script for such a web site will then remove the directory and all contents. In this way, the web pages can be named anything but can still be easily removed.

Figure 12:
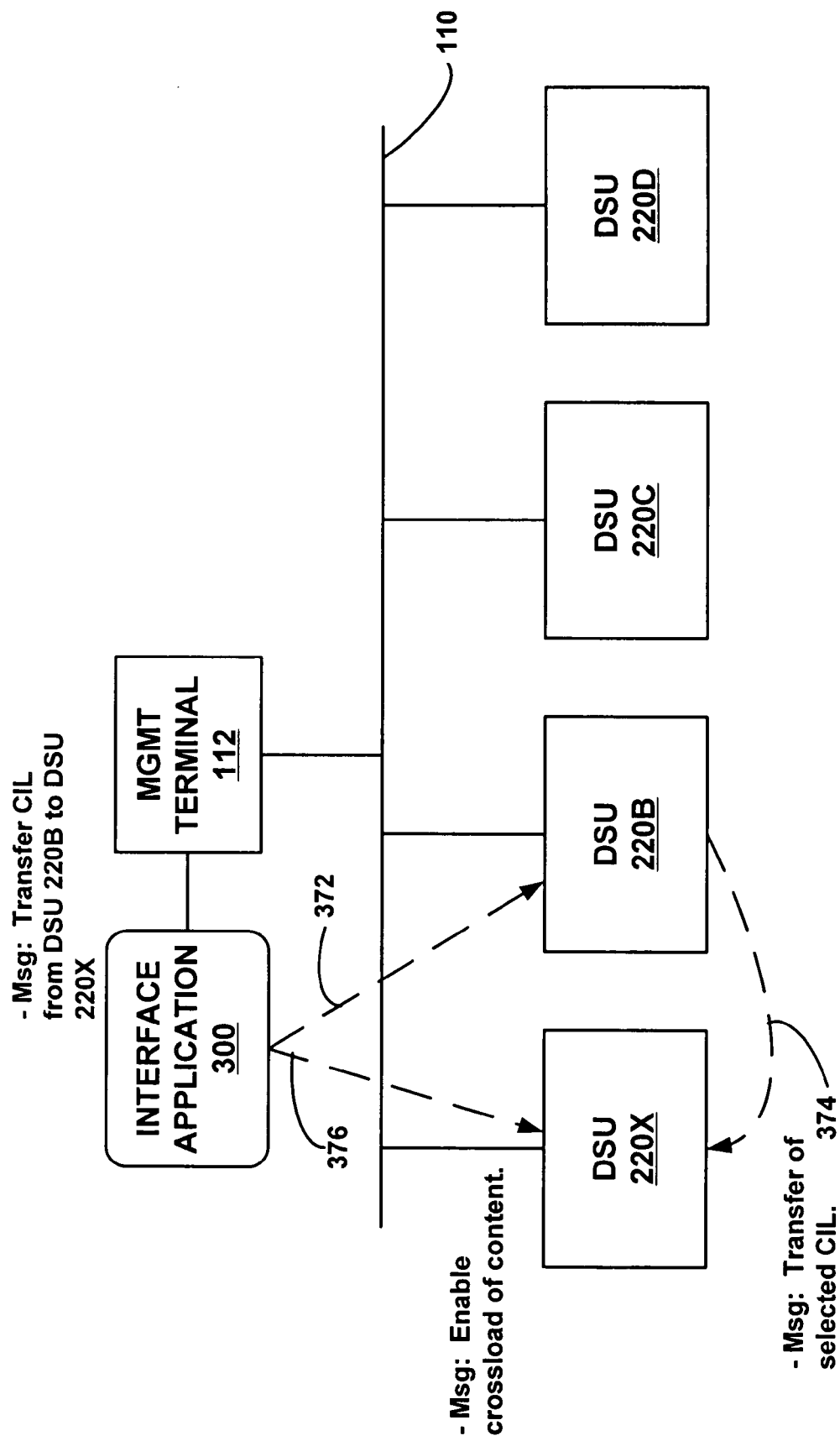
FIG. 12 is a functional block diagram illustrating one embodiment of an approach to controlling a process for cross-loading content to a replacement content server from other content servers using an interface application on a management terminal.
Figure 13:
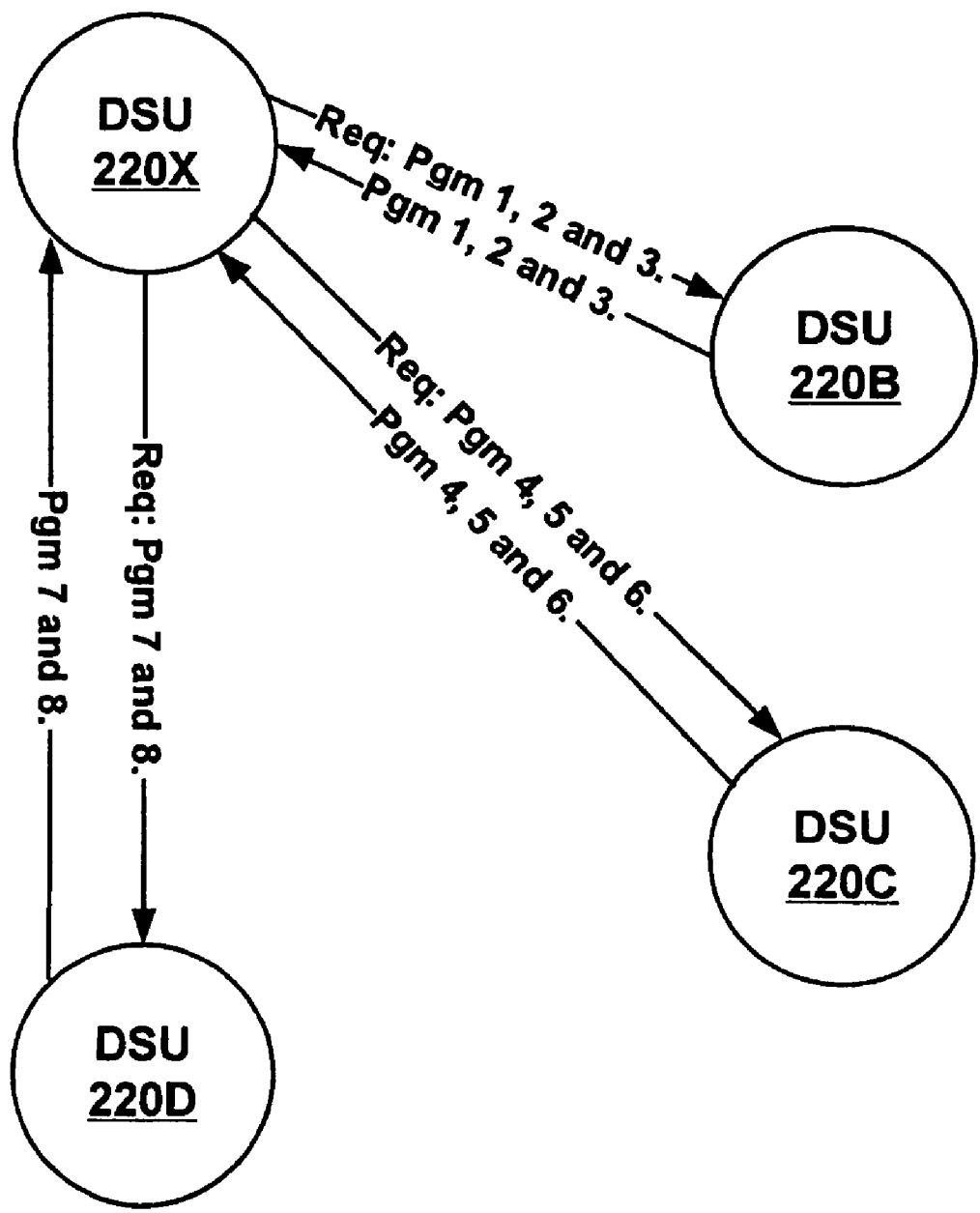
FIG. 13 is a data flow diagram illustrating an example of a crossloading process for transferring content to a replacement content server from other content servers.

In still another embodiment, a DSU may be replaced and content cross-loaded from other DSUs in the system. FIGS. 12 and 13 illustrate an exemplary scenario wherein DSU 220A of FIG. 9 is replaced by another DSU 220X. The remaining DSUs 220B-D have been loaded with content as described above. As a consequence, the necessary content for replacement DSU 220X already resides on the other DSUs. In this example, a user, such as a maintenance technician, enters a command 372 through interface application 300 at management terminal 112 to transfer a CIL from DSU 220B to DSU 220X that describes the content that should reside on DSU 220X. The selected CIL is transferred 374 from DSU 220B to DSU 220X. The user then enters another command 376 to enable crossloading of content from DSUs 220B-D to replacement DSU 220X. In the present example, the CIL indicates that DSU 220X should have Programs 1-8 and the DSU or DSUs where these programs reside.

FIG. 13 illustrates an example of the subsequent program requests and transfers for DSU 220X to crossload Programs 1-8 from DSUs 220B-D, where the distribution of content is similar to the example illustrated in FIG. 7. DSU 220X processes the CIL to identify the program and at least one other DSU where the program resides. For example, DSU 220X can determine from CIL 250 of FIG. 8 which programs reside on certain DSU, e.g. the DSUs in SG4, and request the program from a DSU where the program resides. In FIG. 13, DSU 220X requests Programs 1, 2 and 3 from DSU 220B, which responds by sending Programs 1, 2 and 3. The request may take the form of three separate requests. Likewise, DSU 220X requests Programs 4, 5 and 6 from DSU 220C and receives Programs 4, 5 and 6 from DSU 220C. Programs 7 and 8 are requested of and received from DSU 220D. Thus, in this example, replacement DSU 220X is automatically provisioned with Programs 1-8 without the use of a PDL or similar content loading device. This can simplify maintenance of the system.

We claim:

1. A method for loading content onto an in-flight entertainment system, the method comprising the steps of:
providing a plurality of content server units for storing content;
providing a plurality of network server units;
interconnecting each of the content servers with the plurality of network server units such that each content server cross-loads content with at least one other content server;
connecting a data loading device to the plurality of network server units, where the data loading device includes a set of digital content files for download to the plurality of content servers;
automatically downloading a first subset of the set of digital content files from the data loading device to a first one of the plurality of content server units;
automatically downloading a second subset of the set of digital content files from the data loading device to a second one of the plurality of content server units;
automatically cross-loading the first subset of the set of digital content files from the first content server unit to the second content server unit with at least one of the plurality of network server units; and
automatically cross-loading the second subset of the set of digital content files from the second content server unit to the first content server unit with at least one of the plurality of network server units.

2. The method of claim 1, the method further including the steps of:
automatically downloading a third subset of the set of digital content files from the data loading device to a third one of the plurality of content server units;
automatically cross-loading the first subset of the set of digital content files from the first content server unit to the third content server unit;
automatically cross-loading the second subset of the set of digital content files from the second content server unit to the third content server unit;
automatically cross-loading the third subset of the set of digital content files from the third content server unit to the first content server unit; and
automatically cross-loading the third subset of the set of digital content files from the third content server unit to the second content server unit.

3. The method of claim 1, wherein:
the step of providing a plurality of content server units for storing content further includes providing a plurality of content server units each having multiple network connections;
the step of providing a plurality of network server units further includes providing a plurality of network server units each having multiple connections;
the step of interconnecting each of the content servers with the plurality of network server units includes interconnecting the content servers with the network servers so that multiple content servers can simultaneously communicate with other content servers;
the step of connecting a data loading device to the plurality of network server units further includes connecting the data loading device to the plurality of network server units using multiple network connections;
where the steps of automatically downloading a first subset of the set of digital content files and automatically downloading a second subset of the set of digital content files take place substantially simultaneously; and
the steps of automatically cross-loading the first subset of the set of digital content files and automatically cross-loading the second subset of the set of digital content files take place substantially simultaneously.

4. The method of claim 1, where the method includes:
downloading a first script to the first content server;
downloading a second script to the second content server;
the step of automatically downloading a first subset of the set of digital content files from the data loading device to a first one of the plurality of content server units includes sending a get request for the first subset of the set of digital content files to the data loading device from the first content server unit in accordance with the first script;
the step of automatically downloading a second subset of the set of digital content files from the data loading device to a second one of the plurality of content server units includes sending a get request for the second subset of the set of digital content files to the data loading device from the second content server unit in accordance with the second script;
the step of automatically cross-loading the first subset of the set of digital content files from the first content server unit to the second content server unit includes sending a get request for the first subset of the set of digital content files to the first content server from the second content server unit in accordance with the second script; and the step of automatically cross-loading the second subset of the set of digital content files from the second content server unit to the first content server unit includes sending a get request for the second subset of the set of digital content files to the second content server from the first content server unit in accordance with the first script.

5. The method of claim 1, where the method includes:

downloading a content inventory list to the first and second content servers, where the content inventory list identifies the digital content files and each content server where the digital content files are to be stored; and the step of automatically downloading a first subset of the set of digital content files from the data loading device to a first one of the plurality of content server units includes searching the content inventory list for a file definition for the first subset of the set of digital content files identifying the first content server as a download server for the first subset and, upon finding such a file definition, sending a get request for the first subset of the set of digital content files to the data loading device from the first content server.

6. The method of claim 5, wherein the file definition for the first subset of the set of digital content files indicates that the second content server should have the first subset of the set of digital content files and the step of automatically cross-loading the first subset of the set of digital content files from the first content server unit to the second content server unit includes the steps of:

searching the content inventory list for a file definition indicating that the second content server unit should have content associated with the file definition; and responsive to finding the file definition indicating that the second content server unit should have content associated with the file definition, sending a get request for the associated content to a server indicated as the download server in the file definition.

7. A network architecture for an in-flight entertainment system, the architecture comprising:

a plurality of content server units for storing content;

a plurality of network server units, where each of the content servers is interconnected with the plurality of network server units such that each content server cross-loads content with at least one other content server;

a data loading device configured to be coupled to the plurality of network server units, where the data loading device includes a set of digital content files for download to the plurality of content servers;

where a first one of the plurality of content server units is configured to automatically download a first subset of the set of digital content files from the data loading device to the first content server; and where a second one of the plurality of content servers is configured to automatically cross-load the first subset of the set of digital content files from the first content server to the second content server with at least one of the plurality of network server units.

8. The architecture of claim 7, wherein:

the second content server is further configured to automatically download a second subset of the set of digital content files from the data loading device; and the first content server is further configured to automatically cross-load the second subset of the set of digital content files from the second content server unit to the first content server unit.

9. The architecture of claim 8, wherein:

a third one of the plurality of content server units is configured to automatically download a third subset of the set of digital content files from the data loading device, automatically cross-load the first subset of the set of digital content files from the first content server unit to the third content server unit, and automatically cross-load the second subset of the set of digital content files from the second content server unit to the third content server unit;

the first content server is further configured to automatically cross-load the third subset of the set of digital content files from the third content server unit to the first content server unit; and the second content server is further configured to automatically cross-load the third subset of the set of digital content files from the third content server unit to the second content server unit.

10. The architecture of claim 8, wherein:

each of the plurality of content server units has multiple network connections;

each of the plurality of network server units has multiple connections, where each of the content servers is interconnected with the plurality of network server units so that multiple content servers can simultaneously communicate with other content servers;

the data loading device further includes multiple network connections;

the first and second content servers are further configured to automatically download the first and second subsets of digital content files substantially simultaneously and cross-load the first and second subsets of digital content files substantially simultaneously.

11. The architecture of claim 8, wherein:

the first content server is further configured to download a first script and send a get request for the first subset of the set of digital content files to the data loading device from the first content server unit in accordance with the first script; and the second content server is further configured to download a second script and send a get request for the second subset of the set of digital content files to the data loading device from the second content server unit in accordance with the second script.

12. The architecture of claim 11, wherein:

the second content server is further configured to send a get request for the first subset of the set of digital content files to the first content server from the second content server unit in accordance with the second script; and the firsts content server is further configured to send a get request for the second subset of the set of digital content files to the second content server from the first content server unit in accordance with the first script.

13. The architecture of claim 8, wherein:

the first and second content servers are configured to download a content inventory list, where the content inventory list identifies the digital content files and file definitions indicating each content server where the digital content files are to be stored and identifying at least one of the content servers as a download server for downloading the file associated with the definition from the data loading device; and each of the first and second content servers is further configured to search the content inventory list for a file definition identifying the respective content server as a download server for the file associated with the file definition and, upon finding such a file definition, sending a get request for the file associated with the file definition to the data loading device requesting download of the file to the respective content server.

14. The architecture of claim 13, wherein the file definition indicates which servers that the associated file should be stored on and each of the first and second content servers if further configured to search the content inventory list for a file definition indicating that the respective content server unit should have the file associated with the file definition; and
responsive to finding the file definition indicating that the respective content server unit should have the file associated with the file definition, sending a get request for the associated file to a server indicated as the download server in the file definition.

15. An in-flight entertainment system, the system comprising:
a plurality of content server units for storing content;
a plurality of network server units, where each of the content servers is interconnected with the plurality of network server units such that each content server cross-loads content with at least one other content server;
a data loading device configured to be connected to the plurality of network server units, where the data loading device includes a set of digital content files for download to the plurality of content servers;
means for automatically downloading a first subset of the set of digital content files from the data loading device to a first one of the plurality of content server units;
means for automatically downloading a second subset of the set of digital content files from the data loading device to a second one of the plurality of content server units;
means for automatically cross-loading the first subset of the set of digital content files from the first content server unit to the second content server unit with at least one of the plurality of network server units; and
means for automatically cross-loading the second subset of the set of digital content files from the second content server unit to the first content server unit with at least one of the plurality of network server units.

16. The system of claim 15, the system further including:
means for automatically downloading a third subset of the set of digital content files from the data loading device to a third one of the plurality of content server units;
means for automatically cross-loading the first subset of the set of digital content files from the first content server unit to the third content server unit;
means for automatically cross-loading the second subset of the set of digital content files from the second content server unit to the third content server unit;
means for automatically cross-loading the third subset of the set of digital content files from the third content server unit to the first content server unit; and
means for automatically cross-loading the third subset of the set of digital content files from the third content server unit to the second content server unit.

17. The system of claim 15, wherein:
each of the plurality of content server units has multiple network connections;
each of the plurality of network server units has multiple connections, where each of the content servers is interconnected with the plurality of network server units so that multiple content servers can simultaneously communicate with other content servers;
the data loading device is further configured to connect to the plurality of network server units using multiple network connections;
where the means for automatically downloading a first subset of the set of digital content files and means for automatically downloading a second subset of the set of digital content files are configured to operate substantially simultaneously; and
the means for automatically cross-loading the first subset of the set of digital content files and the means for automatically cross-loading the second subset of the set of digital content files are configured to operate substantially simultaneously.

18. The system of claim 15, where the system includes:
means for downloading a first script to the first content server;
means for downloading a second script to the second content server;
the means for automatically downloading a first subset of the set of digital content files from the data loading device to a first one of the plurality of content server units includes means for sending a get request for the first subset of the set of digital content files to the data loading device from the first content server unit in accordance with the first script;
the means for automatically downloading a second subset of the set of digital content files from the data loading device to a second one of the plurality of content server units includes means for sending a get request for the second subset of the set of digital content files to the data loading device from the second content server unit in accordance with the second script;
the means for automatically cross-loading the first subset of the set of digital content files from the first content server unit to the second content server unit includes means for sending a get request for the first subset of the set of digital content files to the first content server from the second content server unit in accordance with the second script; and
the means for automatically cross-loading the second subset of the set of digital content files from the second content server unit to the first content server unit includes means for sending a get request for the second subset of the set of digital content files to the second content server from the first content server unit in accordance with the first script.

19. The system of claim 15, where the system includes:
means for downloading a content inventory list to the first and second content servers, where the content inventory list identifies the digital content files and each content server where the digital content files are to be stored; and
the means for automatically downloading a first subset of the set of digital content files from the data loading device to a first one of the plurality of content server units includes means for searching the content inventory list for a file definition for the first subset of the set of digital content files identifying the first content server as a download server for the first subset and, upon finding such a file definition, sending a get request for the first subset of the set of digital content files to the data loading device from the first content server.

20. The system of claim 19, wherein the file definition for the first subset of the set of digital content files indicates that the second content server should have the first subset of the set of digital content files and the means for automatically cross-loading the first subset of the set of digital content files from the first content server unit to the second content server unit includes:

means for searching the content inventory list for a file definition indicating that the second content server unit should have content associated with the file definition; and means for sending a get request for the associated content to a server indicated as the download server in the file definition responsive to finding the file definition indicating that the second content server unit should have content associated with the file definition.

21. A method for crossloading content onto a replacement content server unit in an in-flight entertainment system, the method comprising the steps of:

providing a plurality of content server units for storing content;

providing a plurality of network server units;

interconnecting each of the content servers with the plurality of network server units such that each content server cross-loads content with at least one other content server;

downloading a content inventory list to the plurality of content server units, where the content inventory list identifies digital content files and each content server where the digital content files are to be stored, where the content inventory list includes a file definition for each of the digital content files that indicates the ones of the plurality of content server units where the digital content file should reside;

automatically downloading and crossloading the digital content files to the plurality of content server units with at least one of the plurality of network server units in accordance with the content inventory list;

replacing one of the plurality of content server units with a replacement content server unit;

transferring the content inventory list to the replacement content server unit from another one of the plurality of content server units; and automatically crossloading digital content files from the other ones of the plurality of content server units to the replacement content server unit with at least one of the plurality of network server units in accordance with the file definitions in the content inventory list.

22. The method of claim 21, wherein the step of automatically crossloading digital content files from the other ones of the plurality of content server units to the replacement content server unit includes the steps of:

searching the content inventory list for a file definition indicating that the replacement content server unit should have content associated with the file definition;

responsive to finding the file definition indicating that the replacement server unit should have content associated with the file definition, determining from the content inventory list a second one of the plurality of content server units that also should have the content associated with the file definition;

responsive to finding the file definition indicating that the second content server unit should have content associated with the file definition, sending a get request for the associated content from the replacement content server to the second content server; and transferring the associated content from the second content server to the replacement content server.

* * * * *